(12) United States Patent
Takemura et al.

(10) Patent No.: US 9,773,177 B2
(45) Date of Patent: Sep. 26, 2017

(54) SURROUNDING ENVIRONMENT RECOGNITION DEVICE

(71) Applicant: Clarion Co., Ltd., Saitama-shi, Saitama (JP)

(72) Inventors: Masayuki Takemura, Tokyo (JP); Masahiro Kiyohara, Tokyo (JP); Kota Irie, Saitama (JP); Masao Sakata, Saitama (JP); Yoshitaka Uchida, Saitama (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 15/035,812

(22) PCT Filed: Oct. 15, 2014

(86) PCT No.: PCT/JP2014/077463
§ 371 (c)(1),
(2) Date: May 11, 2016

(87) PCT Pub. No.: WO2015/072272
PCT Pub. Date: May 21, 2015

(65) Prior Publication Data
US 2016/0307054 A1    Oct. 20, 2016

(30) Foreign Application Priority Data

Nov. 14, 2013    (JP) ................................. 2013-236240

(51) Int. Cl.
*G06K 9/00* (2006.01)
*H04N 5/217* (2011.01)
(Continued)

(52) U.S. Cl.
CPC ............ *G06K 9/00805* (2013.01); *B60R 1/00* (2013.01); *G06K 9/00791* (2013.01);
(Continued)

(58) Field of Classification Search
CPC ........... G06K 9/00791; G06K 9/00798; G06K 9/00805; H04N 5/2171; H04N 7/18;
(Continued)

(56) References Cited

U.S. PATENT DOCUMENTS

| | | | |
|---|---|---|---|
| 2001/0028729 A1 | 10/2001 | Nishigaki et al. | |
| 2014/0170602 A1* | 6/2014 | Reed ..................... | G09B 19/167 434/62 |

(Continued)

FOREIGN PATENT DOCUMENTS

| | | |
|---|---|---|
| EP | 1 962 254 A2 | 8/2008 |
| JP | 8-202998 A | 8/1996 |

(Continued)

OTHER PUBLICATIONS

International Search Report (PCT/ISA/210) issued in PCT Application No. PCT/JP2014/077463 dated Jan. 20, 2015 with English translation (3 pages).

(Continued)

Primary Examiner — Tom Y Lu
(74) Attorney, Agent, or Firm — Crowell & Moring LLP

(57) ABSTRACT

A surrounding environment recognition device includes: an image acquisition unit that obtains a photographic image from a camera for capturing, via a camera lens, an image of a surrounding environment around a mobile object; an image recognition unit that recognizes an object image of an object present in the surrounding environment based upon the photographic image obtained by the image acquisition unit; an accumulation detection unit that detects accumulation settled on the camera lens based upon the photographic image obtained by the image acquisition unit; a suspension decision-making unit that makes a decision, based upon detection results provided by the accumulation detection unit, whether or not to suspend operation of the image (Continued)

recognition unit; a tracking unit that detects a characteristic quantity in a tracking target image from a specific area in an image captured by the image acquisition unit for a reference frame, determines through calculation an estimated area where the characteristic quantity should be detected in an image captured by the image acquisition unit for a later frame relative to the reference frame and makes a decision as to whether or not the characteristic quantity for the tracking target image is also present in the estimated area; and a resumption decision-making unit that makes a decision, based upon at least decision-making results provided by the tracking unit and indicating whether or not the characteristic quantity for the tracking target image is present, as to whether or not to resume the operation of the image recognition unit currently in a suspended state.

11 Claims, 22 Drawing Sheets

(51) Int. Cl.
*B60R 1/00* (2006.01)
*G08G 1/16* (2006.01)
*H04N 7/18* (2006.01)

(52) U.S. Cl.
CPC .......... *G06K 9/00798* (2013.01); *G08G 1/16* (2013.01); *H04N 5/2171* (2013.01); *B60R 2300/305* (2013.01); *B60R 2300/307* (2013.01); *B60R 2300/8093* (2013.01); *H04N 7/18* (2013.01)

(58) Field of Classification Search
CPC ............. B60R 1/00; B60R 2300/305; B60R 2300/307; B60R 2300/8093; G08G 1/16; G03B 15/00; G03B 17/02
USPC .......................................................... 382/103
See application file for complete search history.

(56) References Cited

U.S. PATENT DOCUMENTS

| | | | |
|---|---|---|---|
| 2015/0220793 A1* | 8/2015 | Kiyohara | G06K 9/00805 382/103 |
| 2016/0165101 A1* | 6/2016 | Akiyama | H04N 5/23229 348/187 |

FOREIGN PATENT DOCUMENTS

| | | |
|---|---|---|
| JP | 2008-236642 A | 10/2008 |
| JP | 2012-38048 A | 2/2012 |

OTHER PUBLICATIONS

Japanese-language Written Opinion (PCT/ISA/237) issued in PCT Application No. PCT/JP2014/077463 dated Jan. 20, 2015 (3 pages).
Extended European Search Report issued in counterpart European Application No. 14861644.4 dated May 23, 2017 (8 pages).

* cited by examiner

FIG. 7A   FIG. 7B   FIG. 7C
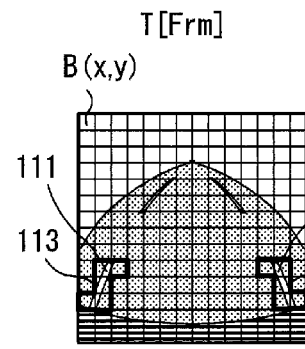
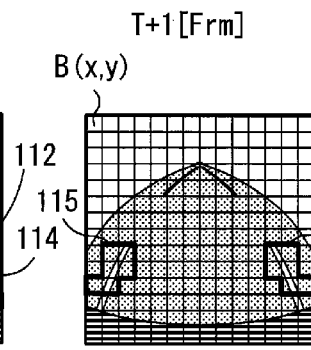
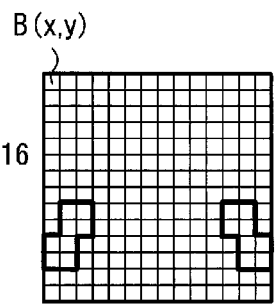
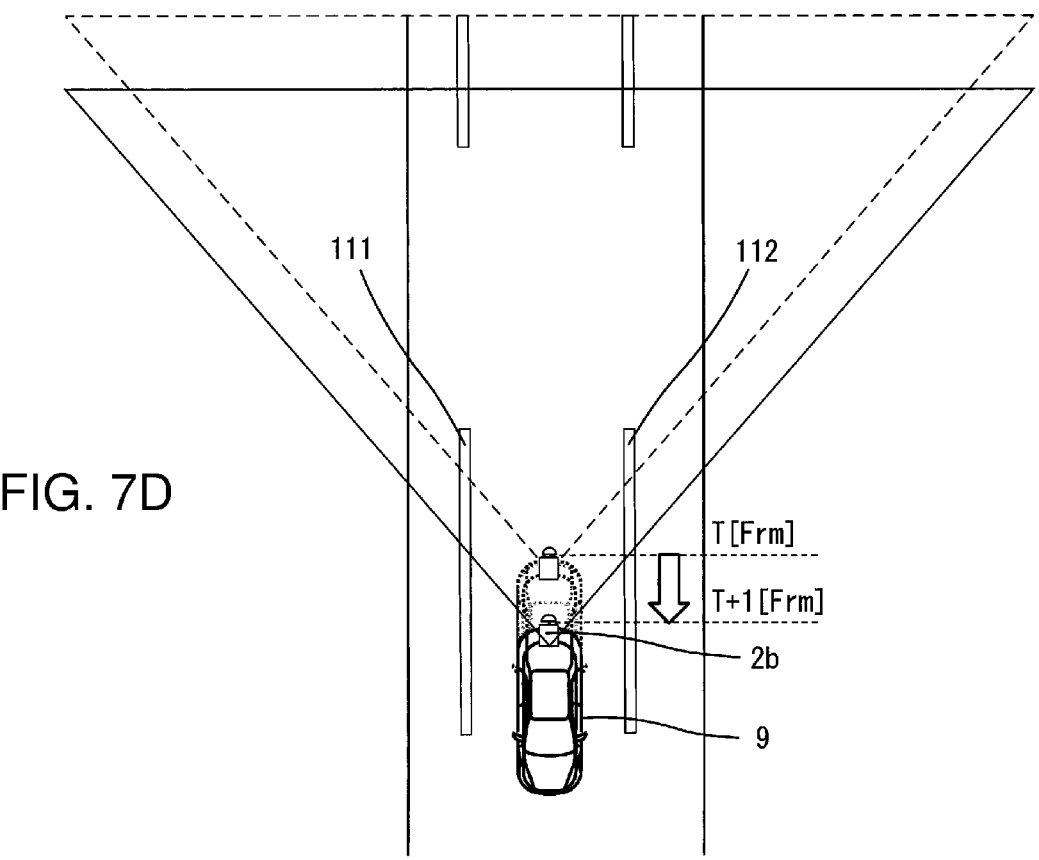
FIG. 7D

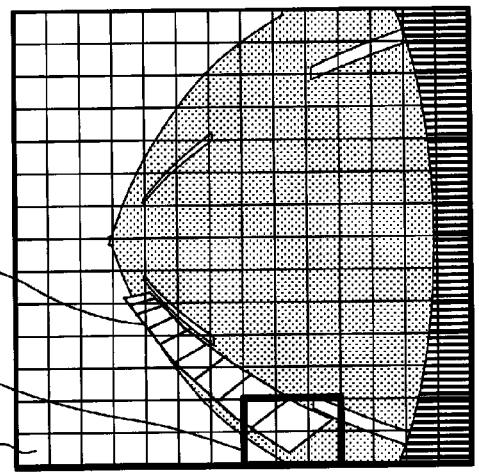
FIG. 10C
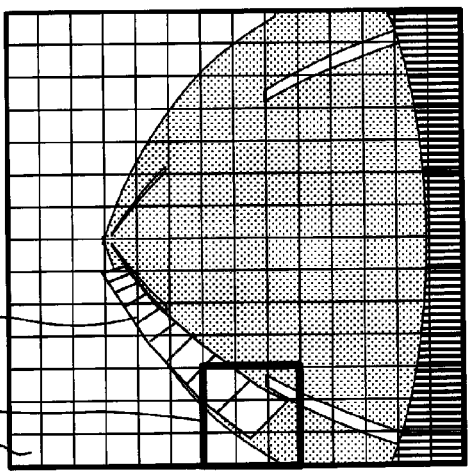
FIG. 10B
FIG. 10A

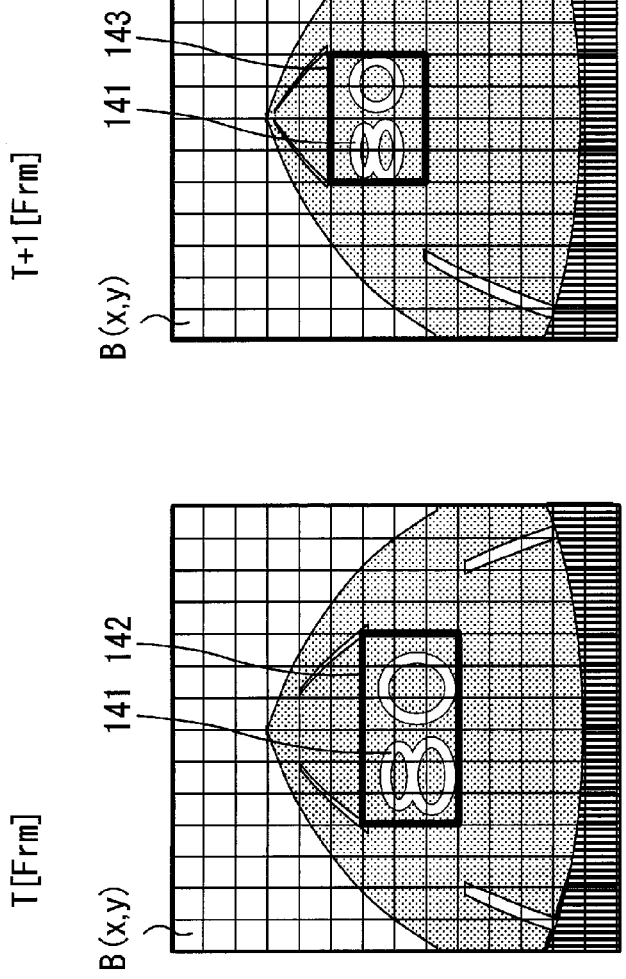

T[Frm]

T+1 [Frm]

SURROUNDING ENVIRONMENT RECOGNITION DEVICE

TECHNICAL FIELD

The present invention relates to a surrounding environment recognition device that recognizes a surrounding environment based upon a photographic image provided by a camera installed at a mobile object.

BACKGROUND ART

A vehicle-mounted device known in the related art, which is capable of detecting an obstacle based upon a photographic image captured with a camera, extracts an image area in the photographic image that remains unchanged over time and suspends obstacle detection based upon a ratio of the image area to the entire photographic image area (see PTL1). PTL1 teaches that obstacle detection is resumed once the ratio of the image area remaining unchanged over time to the entire photographic image area, becomes lower.

CITATION LIST

Patent Literature

PTL1: Japanese Laid Open Patent Publication No. 2012-38048

SUMMARY OF INVENTION

Technical Problem

Processing executed to detect an accumulation on a camera lens is bound to be affected by factors such as the light source environment in the surroundings and changes occurring in the background, and thus, stable detection results may not be obtained through the processing. This means that if object detection processing executed to detect an object such as an obstacle is suspended and then resumed based upon information of unstable detection results of accumulation, the processing for suspending and resuming the detection processing may also become unstable.

Solution to Problem

A surrounding environment recognition device according to a first aspect of the present invention comprises: an image acquisition unit that obtains a photographic image from a camera for capturing, via a camera lens, an image of a surrounding environment around a mobile object; an image recognition unit that recognizes an object image of an object present in the surrounding environment based upon the photographic image obtained by the image acquisition unit; an accumulation detection unit that detects accumulation settled on the camera lens based upon the photographic image obtained by the image acquisition unit; a suspension decision-making unit that makes a decision, based upon detection results provided by the accumulation detection unit, whether or not to suspend operation of the image recognition unit; a tracking unit that detects a characteristic quantity in a tracking target image from a specific area in an image captured by the image acquisition unit for a reference frame, determines through calculation an estimated area where the characteristic quantity should be detected in an image captured by the image acquisition unit for a later frame relative to the reference frame and makes a decision as to whether or not the characteristic quantity for the tracking target image is also present in the estimated area; and a resumption decision-making unit that makes a decision, based upon at least decision-making results provided by the tracking unit and indicating whether or not the characteristic quantity for the tracking target image is present, as to whether or not to resume the operation of the image recognition unit currently in a suspended state.

Advantageous Effects of Invention

The surrounding environment recognition device according to the present invention is capable of stable execution of suspend processing for suspending object detection processing and resume processing for resuming the object detection processing having been suspended.

DESCRIPTION OF EMBODIMENTS

Figure 1:
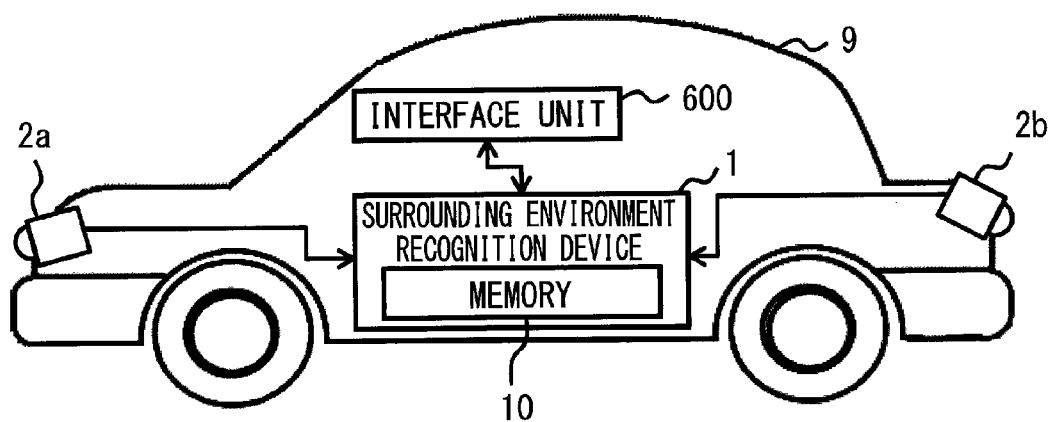
FIG. 1 A block diagram showing the configuration of a camera system equipped with a surrounding environment recognition device achieved in an embodiment of the present invention FIG. 2 A functional block diagram pertaining to the functions of the surrounding environment recognition device achieved in the embodiment of the present invention FIG. 3 A functional block diagram pertaining to an accumulation detection unit FIGS. 4A and 4B Diagrams in reference to which a water drop detection unit is to be explained FIGS. 5A and 5B Diagrams in reference to which a clouding detection unit is to be explained FIG. 6 A functional block diagram pertaining to a tracking unit FIGS. 7A-7D Diagrams in reference to which a lane tracking unit is to be explained FIGS. 8A-8C Diagrams in reference to which a road surface tracking unit is to be explained FIG. 9 A diagram in reference to which a three-dimensional object tracking unit is to be explained FIGS. 10A-10C Diagrams in reference to which the three-dimensional object tracking unit is to be explained FIGS. 11A-11C Diagrams in reference to which a road surface paint tracking unit is to be explained FIGS. 12A and 12B Diagrams in reference to which a distance resolution checking unit is to be explained FIG. 13 A diagram in reference to which a system suspension decision-making unit is to be described FIG. 14 A diagram in reference to which a lens condition analysis unit is to be explained FIG. 15 A diagram in reference to which a suppression control unit is to be explained FIG. 16 A functional block diagram pertaining to an application execution unit FIG. 17 A flowchart of the processing executed by a lane recognition unit FIG. 18 A diagram in reference to which the lane recognition unit is to be explained FIG. 19 A flowchart of the processing executed by a vehicle detection unit FIG. 20 A flowchart of the processing executed by the system suspension decision-making unit FIGS. 21A and 21B Diagrams illustrating how a lens map may be updated by using an accumulation map FIGS. 22A-22C Diagrams illustrating how a lens map may be updated by using a resumption map

FIG. 1 is a block diagram showing the configuration of a camera system equipped with a surrounding environment recognition device 1 achieved in an embodiment of the present invention. The camera system in FIG. 1, which is installed in a vehicle 9, comprises the surrounding environment recognition device 1, cameras 2a and 2b and an interface unit 600.

The surrounding environment recognition device 1 is an ECU (electric control unit) installed in a vehicle, comprising a CPU and a memory 10. The memory 10 includes a ROM and a RAM, which is used as a working memory and a buffer memory, with a program executed by the CPU in the surrounding environment recognition device 1 stored in the ROM.

The surrounding environment recognition device 1 is connected to the cameras 2a and 2b and the interface unit 600. The surrounding environment recognition device 1 is also connected to a CAN (controller area network) and thus is able to obtain information from a car navigation system, an ECU with a higher-order designation relative to the surrounding environment recognition device 1 or the like. The surrounding environment recognition device 1 is able to obtain, for instance, information pertaining to the vehicle 9 such as the vehicle traveling speed, the yaw rate and the wiper operating state, through the CAN.

The cameras 2a and 2b are each installed at a specific part of the vehicle 9 such as the body or the bumper. The camera 2a is installed with the camera lens oriented toward an area ahead of the vehicle 9 and assumes an angle of view wide enough to allow it to capture images of the road surface ahead of the vehicle and road signs along the road ahead of the vehicle at the same time. The camera 2b is installed with the camera lens oriented rearward relative to the vehicle 9 and assumes an angle of view wide enough to allow it to capture images of the road surface behind the vehicle and the landscape behind the vehicle at the same time.

The surrounding environment recognition device 1 executes image recognition processing in photographic images provided from the camera 2a and the camera 2b so as to recognize images of a lane mark, another vehicle, a pedestrian, a road sign, a parking frame and the like in the photographic images. The term "lane mark" in this context refers to a lane demarcation line, a road center line or a road edge marking, formed with paint, Bott's dots or the like. Based upon the results of the image recognition processing, the surrounding environment recognition device 1 is able to detect that the vehicle is about to depart the lane in which it is currently traveling or that the vehicle is about to collide with another vehicle.

Water drops, mud, a snow-melting agent or the like may settle onto the camera lenses in the cameras 2a and 2b. While the vehicle 9 is traveling, in particular, water, mud, a snow-melting agent or the like on the road is more likely to be splashed up onto the vehicle and settle on a camera lens. Water drops settling on the camera lens, such as rain drops, are likely to contain a great deal of impurities and when they dry, they may form water stains on the camera lens. In addition, water stains and muddy water on the camera lens may cause clouding at the camera lens. In the following description, foreign matter such as water drops, water stains and mud settled on the camera lens and dirt on the camera lens such as clouding will be collectively referred to as accumulations.

The interface unit 600 is connected to various parts of the vehicle 9, such as a warning lamp, a warning buzzer, an accelerator, a braking system, a navigation device, an instrument panel, an air pump, a washer pump and a wiper drive unit (none shown). The interface unit 600 controls the various parts of the vehicle 9 by following commands issued by the surrounding environment recognition device 1.

Figure 2:
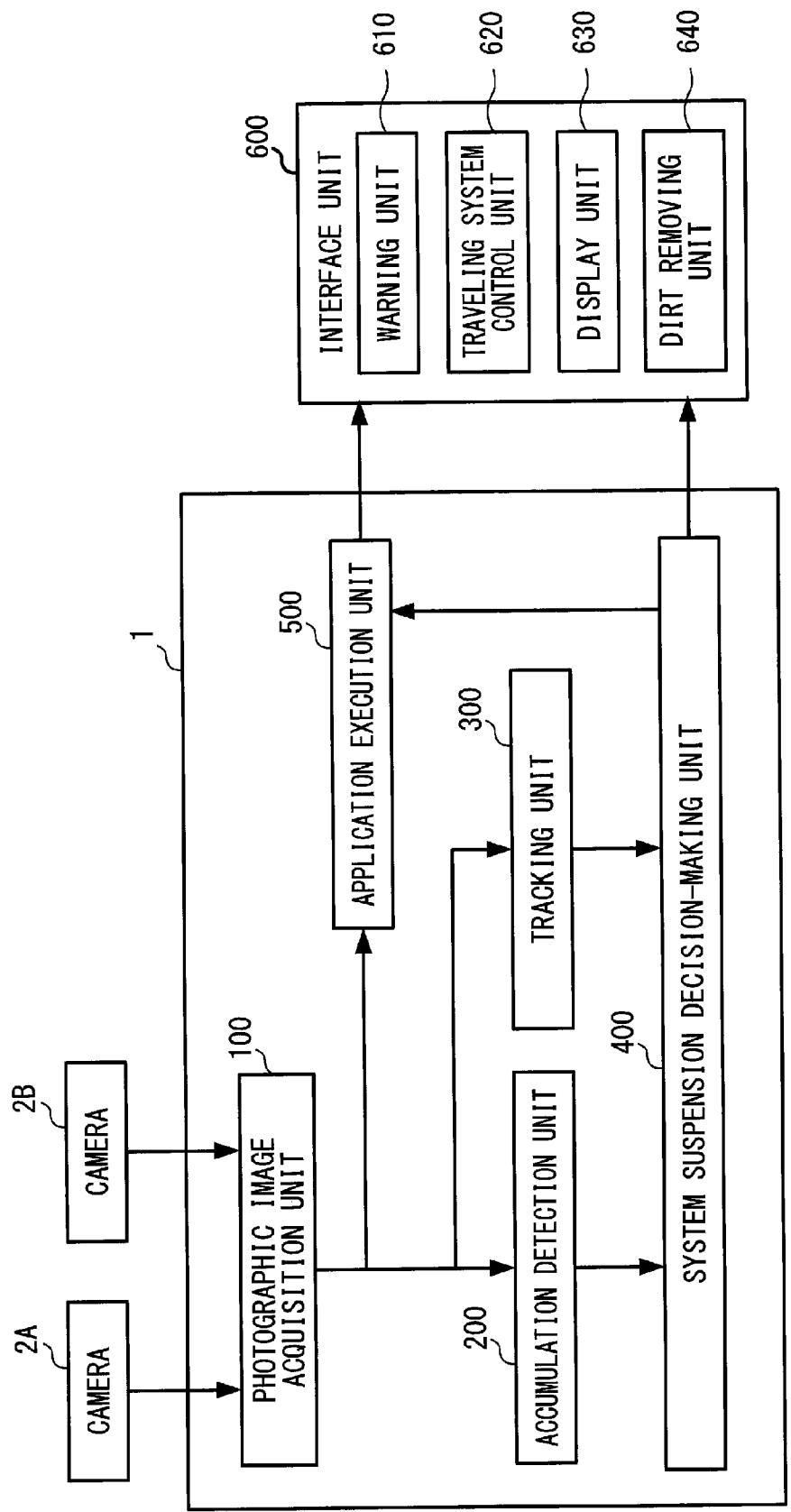

FIG. 2 is a functional block diagram pertaining to the surrounding environment recognition device 1. The surrounding environment recognition device 1, executing a program stored in the memory 10, is able to function as a photographic image acquisition unit 100, an accumulation detection unit 200, a tracking unit 300, a system suspension decision-making unit 400 and an application execution unit 500.

The photographic image acquisition unit 100 individually obtains photographic images from the camera 2a and the camera 2b at a predetermined frame rate. The photographic image acquisition unit 100 outputs the photographic images, each having been obtained in correspondence to a given frame, to the accumulation detection unit 200, the tracking unit 300 and the application execution unit 500.

The accumulation detection unit 200 detects various types of accumulations adhering to the camera lenses in the cameras 2a and 2b in the photographic images output from the photographic image acquisition unit 100. The accumulation detection unit 200 generates accumulation detection results in correspondence to each accumulation type, as will be explained later and outputs various sets of the detection results to the system suspension decision-making unit 400.

The tracking unit 300 tracks structures that appear on the road surface in the photographic images output from the photographic image acquisition unit 100, such as lane marks, road surface conditions, three-dimensional objects and road surface paint, by designating them as tracking targets. A tracking operation is executed by detecting a characteristic quantity unique to a given structure in corresponding image areas in a plurality of photographic images in different frames. In other words, the tracking unit 300 may otherwise be referred to as a same-structure detection unit. The tracking unit 300 determines that a tracking operation has been successful if a characteristic quantity equal to a characteristic quantity of a structure detected in a specific area of a photographic image in a reference frame (i.e., a reference image), is detected in an estimated area in a image captured for a frame different from the reference frame. The tracking unit 300 further evaluates the levels of visibility at the camera lenses in the cameras 2a and 2b based upon whether or not various types of tracking processing, which will be described in detail later, have been successful. The tracking unit 300 outputs visibility evaluation results to the system suspension decision-making unit 400.

The application execution unit 500 is an image recognition unit that executes image recognition on photographic images output by the photographic image acquisition unit 100. Through the image recognition executed on the photographic images, the application execution unit 500 detects images of objects such as lane marks, other vehicles, pedestrians, road signs and parking frames. The detection results provided by the application execution unit 500 are used for preventing the vehicle from drifting out of the current lane, preventing collision with another vehicle or a pedestrian, parking assistance and the like. It is to be noted that while an object image detected by the application execution unit 500 may be a structure on the road, such as a lane mark that is also tracked by the tracking unit 300, the application execution unit 500 may also detect objects that are not tracked by the tracking unit 300.

The presence of an accumulation on a camera lens may cause erroneous detection or disabled detection at the application execution unit 500. Based upon an output from the accumulation detection unit 200, the system suspension decision-making unit 400 gives up (suspends) detection by the application execution unit 500. In addition, based upon an output from the accumulation detection unit 200 and an output from the tracking unit 300, the system suspension decision-making unit 400 allows the detection by the application execution unit 500, having been given up, to be resumed. The system suspension decision-making unit 400 will be described in detail later.

The interface unit 600 includes a warning unit 610, a traveling system control unit 620, a display unit 630 and a dirt removing unit 640. The warning unit 610 outputs a warning to the driver of the vehicle via a warning lamp, a warning buzzer, a warning display screen or the like. The traveling system control unit 620 controls the accelerator, the braking system and the steering angle in the vehicle 9 based upon the output results provided by the surrounding environment recognition device 1. At the display unit 630 configured as a display screen of the navigation system installed in the vehicle 9 or the instrument panel in the vehicle 9, various screen images, including a warning screen image, provided in place of the warning output by the warning unit 610, are displayed. The dirt removing unit 640 is a removal device, configured with an air pump, a washer pump and a wiper drive unit, which removes accumulations from the camera lenses in the cameras 2a and 2b.

(Accumulation Detection Unit 200)

Figure 3:
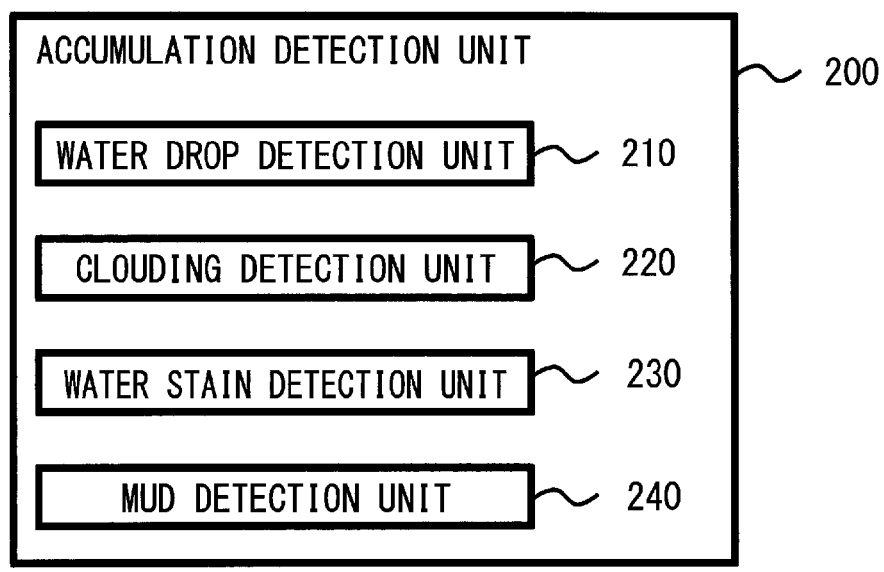

FIG. 3 presents a structural example pertaining to the functions of the accumulation detection unit 200. The accumulation detection unit 200 in the example presented in FIG. 3 includes a water drop detection unit 210, a clouding detection unit 220, a water stain detection unit 230 and a mud detection unit 240.

(Water Drop Detection Unit 210)

The water drop detection unit 210 detects water drops settled on the cameras 2a and 2b. In reference to FIG. 4(*a*) and FIG. 4(*b*), the operation executed by the water drop detection unit 210 will be described. As FIG. 4(*a*) indicates, the water drop detection unit 210 divides the image area in a photographic image 30 into a plurality of blocks B(x, y). For instance, the origin point may be set at the left corner of the image area and the image area may be divided into 100×100 image portions. In such a case, the image area includes 10,000 image blocks, i.e., a block B(0, 0) through a block B(100, 100). In the following description, a given image block will be notated as a block B(x, y). The image blocks in the photographic image each include a plurality of pixels. For instance, the image blocks in a photographic image captured with a camera equipped with an image sensor having 100,000 pixels will each include an image with 10 pixels.

The water drop detection unit 210 calculates a score $S_1(x, y)$ in correspondence to each block B(x, y). The score $S_1(x, y)$ takes on an initial value of 0 and increases by a predetermined value each time it is decided that a water drop is present in the particular block B(x, y) through the decision-making processing described below.

Figure 4A:
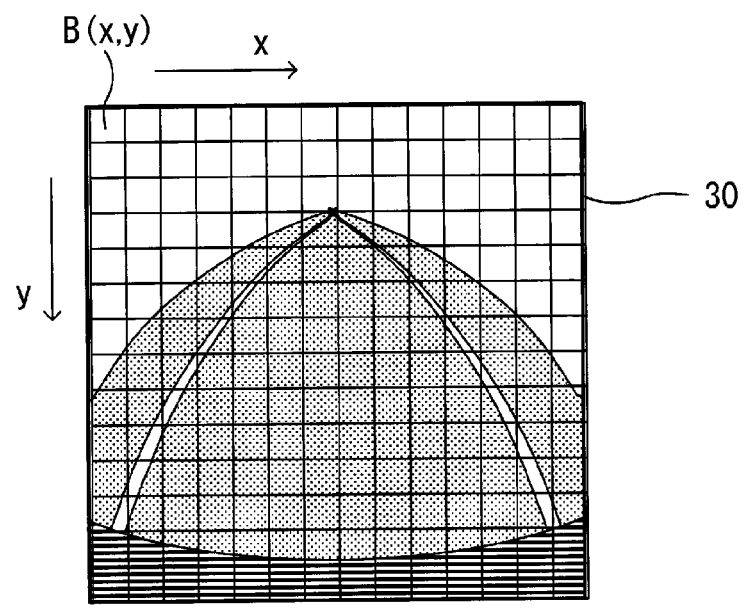
Figure 4B:
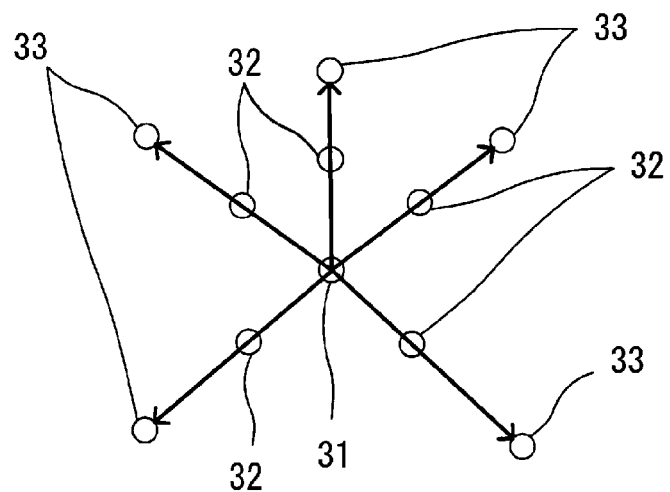

The water drop detection unit 210 calculates the score for each pixel as described below. FIG. 4(*b*) shows a given pixel 31 designated as a target point. The water drop detection unit 210 sets pixels each set apart from the target point 31 by a predetermined distance (e.g., by three pixels), along the upward direction, a right-upward direction, a right-downward direction, a left-upward direction and a left-downward direction, as inner reference points 32, and also sets pixels further set apart by a predetermined distance (e.g., by another three pixels) along these five directions as outer reference points 33. Next, the water drop detection unit 210 calculates a luminance value for each of the inner reference points 32 and the outer reference points 33. It is to be noted that the number of pixels representing each of the target point 31, the inner reference points 32 and the outer reference points 33 may be, for instance, one pixel and is smaller than the number of pixels included in each image block.

Due to a lens effect, the center of a water drop is highly likely to be brighter than the edge of the water drop. Accordingly, the water drop detection unit 210 makes a decision as to whether or not the luminance at the inner reference point 32 is higher than luminance at the corresponding outer reference point 33 along each of the five directions. In other words, the water drop detection unit 210 makes a decision as to whether or not the target point 31 is located at the center of the water drop. If the luminance at the inner reference point 32 set in each direction is higher than the luminance at the outer reference point 33 set along the matching direction, the water drop detection unit 210 increases the score $S_1(x, y)$ for the block B(x, y) containing the particular target point 31 by a predetermined value of, for instance, 1.

Next, the water drop detection unit 210 detects any block among all the blocks B(x, y), with the score $S_1(x, y)$ thereof taking a value equal to or greater than a predetermined value, and calculates the number $N_1$ of the blocks thus detected. The water drop detection unit 230 calculates the luminance differences, each representing the difference between the luminance at an inner reference point 32 and the luminance at the corresponding outer reference point 33, for the pixels included in the $N_1$ blocks having been detected and then calculates an average luminance difference $A_{D1}$ of the luminance differences calculated for these pixels.

Each time the photographic image acquisition unit 100 outputs a photographic image, the water drop detection unit 210 updates the score $S_1(x, y)$ corresponding to each block B(x, y). In addition, over intervals each corresponding to t1 frames, the water drop detection unit 210 calculates a normalized score $NS_1(x, y)$ by dividing the score $S_1(x, y)$ by the number of frames t1.

The water drop detection unit 210 calculates the average $A_{S1}$ of the normalized scores $NS_1(x, y)$ corresponding to all the blocks B(x, y). The water drop detection unit 210 counts the length of time t2 over which the average $A_{S1}$ of the normalized scores $NS_1(x, y)$ has been in excess of a predetermined value and calculates a reliability factor $R_1$ of the scores $S_1(x, y)$ based upon the time length t2. The reliability factor $R_1$ may be calculated by, for instance, dividing the time length t2 by a predetermined value.

In correspondence to each frame the water drop detection unit 210 outputs the reliability factor $R_1$, the latest normalized scores $NS_1(x, y)$, the number of blocks $N_1$ with the scores $S_1(x, y)$ thereof equal to or greater than the predetermined value and the luminance difference average $A_{D1}$ to the system suspension decision-making unit 400. Once the normalized scores $NS_1(x, y)$ and the like are transmitted to the system suspension decision-making unit 400, the water drop detection unit 210 resets the scores $S_1(x, y)$ and the time count t2 to 0.

(Clouding Detection Unit 220)

In reference to FIG. 5(*a*), the operation executed by the clouding detection unit 220 will be described. As FIG. 5(*a*) indicates, the clouding detection unit 220 divides the image area in a photographic image 40 into a plurality of blocks B(x, y). The blocks B(x, y) each include a plurality of pixels in the photographic image. The clouding detection unit 220 calculates a score $S_2(x, y)$ in correspondence to each block B(x, y).

Figure 5A:
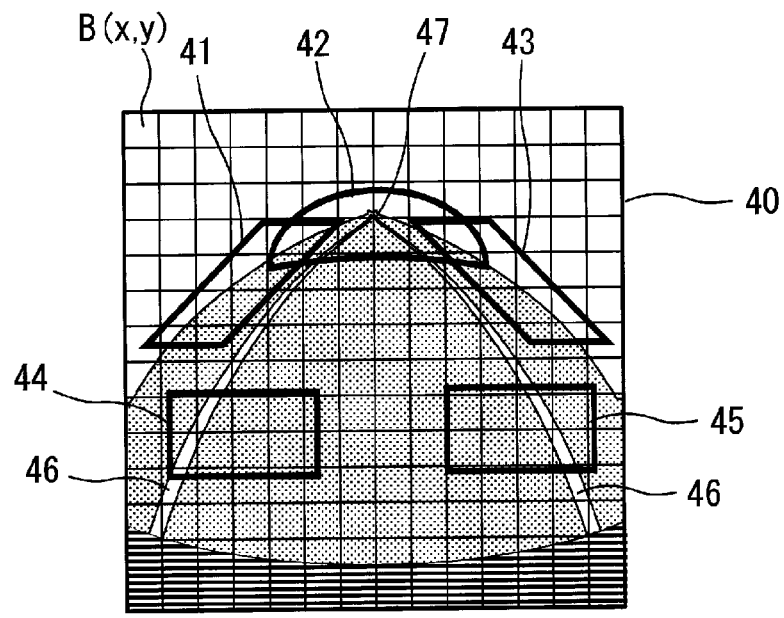

As shown in FIG. 5(a), the clouding detection unit 220 sets an upper left detection area 41, an upper detection area 42 and an upper right detection area 43 at a position at which the horizon is predicted to be included in the photographic image. The upper detection area 42 is set at a position that includes the vanishing point of the two lane marks running parallel to each other on the road surface. In the example presented in FIG. 5(a), a vanishing point 47 of two lane marks 46 is included in the upper detection area 42. The upper left detection area 41 is set to the left of the upper detection area 42, whereas the upper right detection area 43 is set to the right of the upper detection area 42. In addition, the clouding detection unit 220 sets a lower left detection area 44 and a lower right detection area 45 at positions where the lane marks are expected to be in the photographic image.

The clouding detection unit 220 executes horizontal edge detection processing for the pixels included in the upper left detection area 41, the upper detection area 42, the upper right detection area 43, the lower left detection area 44 and the lower right detection area 45. Through the edge detection executed for the upper left detection area 41, the upper detection area 42 and the upper right detection area 43, edges such as the horizon are detected. In addition, through the edge detection executed for the lower left detection area 44 and the lower right detection area 45, edges of the lane marks 46 and the like are detected. The clouding detection unit 220 calculates an edge intensity level for each of the pixels in the various detection areas 41 through 45. The clouding detection unit 220 next calculates an average edge intensity value $A_{E2}$ in correspondence to each of the detection areas 41 through 45 and makes a decision as to whether or not the average value $A_{E2}$ is less than a predetermined threshold value $\epsilon$. The clouding detection unit 220 judges that clouding is manifest in any detection area in which the average edge intensity value $A_{E2}$ is determined to be less than the threshold value $\epsilon$.

Figure 5B:
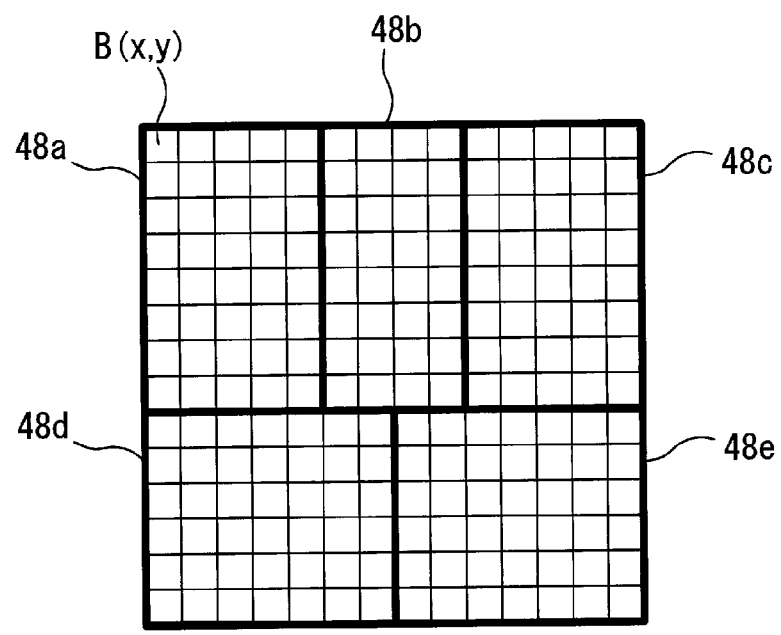

The clouding detection unit 220 divides the image area into five block groups, as shown in FIG. 5(b). The scores $S_2(x, y)$ calculated for the blocks B(x, y) in an upper left group 48a are each increased by 1 if the upper left detection area 41 is determined to be clouded. The scores $S_2(x, y)$ calculated for the blocks B(x, y) in an upper middle group 48b are each increased by 1 if the upper detection area 42 is determined to be clouded. Likewise, the blocks B(x, y) belonging to an upper right group 48c correspond to the upper right detection area 43, the blocks B(x, y) belonging to a lower left group 48d correspond to the lower left detection area 44 and the blocks B(x, y) belonging to a lower right group 48e correspond to the lower right detection area 45. The scores $S_2(x, y)$ calculated for the blocks B(x, y) belonging to any of the groups 48a through 48e are each increased by 1 if the corresponding detection area is determined to be clouded.

It is to be noted that the blocks B(x, y) located between the lower left detection area 44 and the lower right detection area 45 may be assigned into a separate group independent of the group 48d and the group 48e. It is desirable that the scores $S_2(x, y)$ in the group created between the group 48d and the group 48e be linearly interpolated by using the scores $S_2(x, y)$ in the group 48d and the scores $S_2(x, y)$ in the group 48e.

The clouding detection unit 220 calculates the number $N_2$ of detection areas among the detection areas 41 through 45, each having an average edge intensity value $A_{E2}$ less than the threshold value $\epsilon$, i.e., the number of detection areas where clouding has been detected. Subsequently, the clouding detection unit 220 calculates a time length t3 through which clouding has been continuously judged to be present in each of the detection areas 41 through 45. The clouding detection unit 220 then calculates an average continuous time length t4 by dividing the total sum of the time lengths t3, each corresponding to one of the detection areas 41 through 45, by the number of detection areas, i.e., 5. The clouding detection unit 220 converts the average continuous time length t4 to a reliability factor $R_2$ pertaining to the detection results provided by the clouding detection unit 220. The clouding detection unit 220 may calculate the reliability factor $R_2$ by, for instance, dividing the average continuous time length t4 by a predetermined value. In addition, the clouding detection unit 220 calculates an average edge intensity $A_{A2}$ by dividing the total sum of the edge intensity average values $A_{E2}$ corresponding to the detection areas having been detected to be in a clouded state by the number of detection areas, i.e., by 5.

Each time the photographic image acquisition unit 100 outputs a photographic image, the clouding detection unit 220 updates the score $S_2(x, y)$ corresponding to each block B(x, y). In addition, over intervals each corresponding to t1 frames, the clouding detection unit 220 calculates a normalized score $NS_2(x, y)$ by dividing the score $S_2(x, y)$ by the number of frames t1. Furthermore, in correspondence to each frame, the clouding detection unit 220 outputs the reliability factor $R_2$, the number $N_2$ of detection areas having been detected to be in a clouded state, the average edge intensity value $A_{A2}$ and the latest normalized scores $NS_2(x, y)$ to the system suspension decision-making unit 400. Once the normalized scores $NS_2(x, y)$ and the like are transmitted to the system suspension decision-making unit 400, the clouding detection unit 220 resets the scores $S_2(x, y)$ to 0.

(Water Stain Detection Unit 230)

The operation executed by the water stain detection unit 230 will be described next. As does the water drop detection unit 210, the water stain detection unit 230 divides the image area of a photographic image 30 into a plurality of blocks B(x, y), as indicated in FIG. 4(a).

The water stain detection unit 230 executes longitudinal edge detection processing over the entire photographic image 30 along the horizontal direction so as to generate edge intensity data indicating the edge intensity levels at the individual pixels. The water stain detection unit 230 then increases a score $S_3(x, y)$ for each block B(x, y) by a predetermined value, based upon whether or not an edge detected at a given pixel position in the block B(x, y) runs along the same direction over a predetermined number of successive frames. The score $S_3(x, y)$ may be increased by, for instance, 1 if the number of edges running along the same direction detected at corresponding pixel positions over a number of successive frames exceeds a predetermined threshold value.

The water stain detection unit 230 obtains an elapsed time length t5(x, y) having elapsed since the score $S_3(x, y)$ corresponding to each block B(x, y) exceeded an optimal threshold value. The water stain detection unit 230 then calculates the average of the elapsed time lengths t5(x, y) corresponding to all the blocks B(x, y) and calculates a reliability factor $R_3$ based upon the calculation results. The water stain detection unit 230 may calculate the reliability factor $R_3$ by, for instance, dividing the average of the elapsed time lengths $t5(x, y)$ corresponding to all the blocks $B(x, y)$ by a predetermined value.

Each time the photographic image acquisition unit 100 outputs a photographic image, the water stain detection unit 230 updates the score $S_3(x, y)$ corresponding to each block $B(x, y)$. In addition, over intervals each corresponding to t1 frames, the water stain detection unit 230 calculates a normalized score $NS_3(x, y)$ by dividing the score $S_3(x, y)$ by the number of frames t1.

The water stain detection unit 230 detects any block among all the blocks $B(x, y)$ with the score $S_3(x, y)$ thereof indicating a value equal to or greater than a predetermined value and calculates the number $N_3$ of such blocks. In correspondence to each frame, the water stain detection unit 230 outputs the reliability factor $R_3$, the latest normalized scores $NS_3(x, y)$, and the number of blocks $N_3$ with the scores $S_3(x, y)$ thereof each indicating a value equal to or greater than a predetermined value to the system suspension decision-making unit 400. Once the normalized scores $NS_3(x, y)$ and the like are transmitted to the system suspension decision-making unit 400, the water stain detection unit 230 resets the scores $S_3(x, y)$ to 0.

(Mud Detection Unit 240)

The operation executed by the mud detection unit 240 will be described next. As does the water drop detection unit 210, the mud detection unit 240 divides the image area of a photographic image 30 into a plurality of blocks $B(x, y)$, as indicated in FIG. 4(a).

The mud detection unit 240 detects the luminance at each pixel in the photographic image 30. The mud detection unit 240 then calculates a total sum $I_T(x, y)$ of the luminance values at the individual pixels included in each block $B(x, y)$. The mud detection unit 240 calculates a difference $\Delta I(x, y)$ between the total sum $I_T(x, y)$ calculated for each block $B(x, y)$ in correspondence to the image captured in the current frame T and the total sum $I_{T-1}(x, y)$ calculated for the same block $B(x, y)$ in correspondence to the image captured for the preceding frame T−1.

The mud detection unit 240 detects any block $B(x, y)$ indicating a small value for $\Delta I(x, y)$ with its $I_T(x, y)$ indicating a value smaller than those calculated for the surrounding blocks, and increases a score $S_4(x, y)$ corresponding to this block $B(x, y)$ by a predetermined value of 1. In addition, the mud detection unit 240 adds up the values calculated for $\Delta I(x, y)$ in correspondence to each block $B(x, y)$ until the scores $S_4(x, y)$ are reset.

Each time the photographic image acquisition unit 100 outputs a photographic image, the mud detection unit 240 updates the score $S_4(x, y)$ corresponding to each block $B(x, y)$. In addition, over intervals each corresponding to t1 frames, the mud detection unit 240 calculates a normalized score $NS_4(x, y)$ by dividing the score $S_4(x, y)$ by the number of frames t1.

In addition, the mud detection unit 240 obtains an elapsed time length $t6(x, y)$ having elapsed since the score $S_4(x, y)$ corresponding to each block $B(x, y)$ exceeded an optimal threshold value. The mud detection unit 240 then calculates the average of the elapsed time lengths $t6(x, y)$ corresponding to all the blocks $B(x, y)$ and calculates a reliability factor $R_4$ based upon the calculation results. The mud detection unit 240 may calculate the reliability factor $R_4$ by, for instance, dividing the average of the elapsed time lengths $t6(x, y)$ corresponding to all the blocks $B(x, y)$, by a predetermined value.

In addition, in correspondence to each frame, the mud detection unit 240 outputs the reliability factor $R_4$, the latest normalized scores $NS_4(x, y)$, and the number of blocks $N_4$ with the scores $S_4(x, y)$ thereof each indicating a value equal to or greater than a predetermined value to the system suspension decision-making unit 400. The mud detection unit 240 resets the scores $S_4(x, y)$ to 0 after outputting the normalized scores $NS_4(x, y)$ and the like to the system suspension decision-making unit 400.

(Tracking Unit 300)

Figure 6:
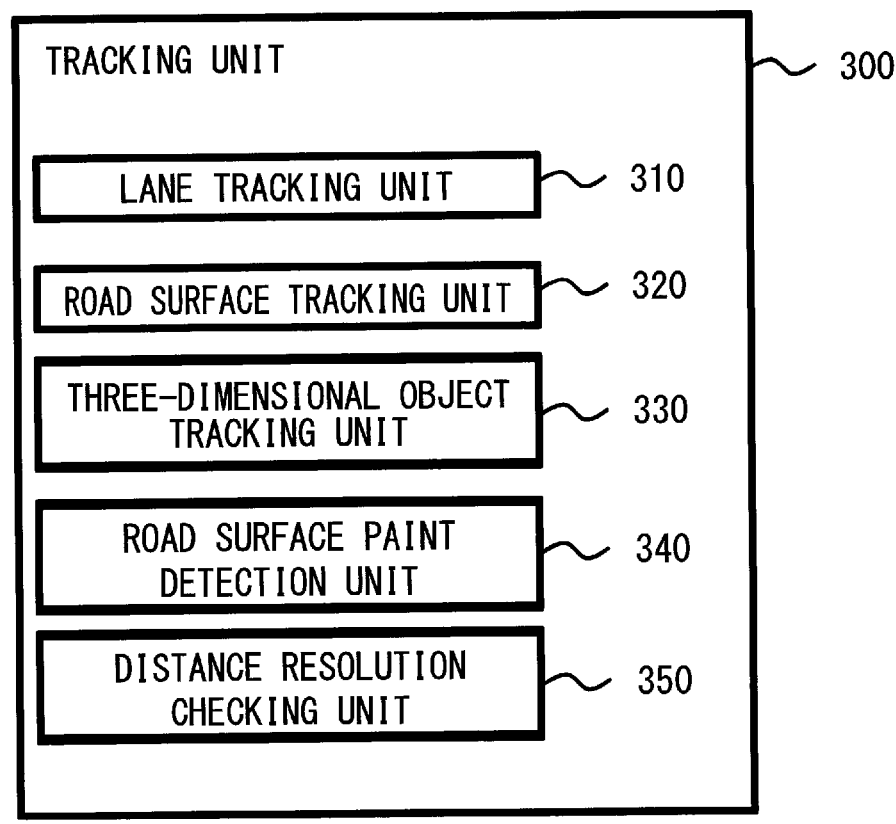

FIG. 6 presents an example of a functional structure that may be adopted in the tracking unit 300. The tracking unit 300 in the example presented in FIG. 6 includes a lane tracking unit 310, a road surface tracking unit 320, a three-dimensional object tracking unit 330, a road surface paint detection unit 340 and a distance resolution tracking unit 350.

(Lane Tracking Unit 310)

The lane tracking unit 310 tracks lane marks based upon lane mark recognition results (to be described later) provided by the application execution unit 500. The lane tracking unit 310 then makes a decision as to whether or not the tracking operation has been successful. Namely, the lane tracking unit 310 makes a decision as to whether or not a lane recognized in a photographic image corresponding to a specific frame T is also recognized at a position predicted to be taken by the lane in the photographic image in the succeeding frame T+1. If the lane marks are tracked successfully, the lane tracking unit 310 judges that good visibility is assured in the image areas containing the image of a tracking target lane mark.

In reference to the example presented in FIG. 7(a) through 7(d), the operation executed by the lane tracking unit 310 will be explained. In this example, the vehicle 9 is traveling in a lane set between dashed-line lane marks, as shown in FIG. 7(d). The camera 2b, which captures images of the space behind the vehicle 9, captures an image such as that shown in FIG. 7(a) for the frame T. The photographic image in FIG. 7(a) is divided into a plurality of image blocks $B(x, y)$. An image of the bumper of the vehicle 9 is captured in the blocks $B(x, y)$ located in the area along the lower side of the photographic image in FIG. 7(a) with images of the ends of a lane mark 111 and a lane mark 112 captured near the two ends of the bumper image.

The application execution unit 500 detects characteristic points pertaining to the lane marks 111 and 112 in the photographic image through longitudinal edge detection processing executed through horizontal scanning. The lane tracking unit 310 obtains information indicating the positions and characteristic quantities (luminance differences) with regard to these characteristic points from the application execution unit 500. In the example presented in FIG. 7(a), the characteristic points related to the lane marks 111 and 112 are detected in image areas 113 and 114 made up with blocks $B(x, y)$ enclosed by the bold lines.

Based upon the traveling speed of the vehicle 9, the frame rate and the like, the lane tracking unit 310 estimates the position to be taken by the vehicle 9 at the time point at which the next frame T+1 is captured. Based upon the estimated position the vehicle 9 is predicted to take, the lane tracking unit 310 predicts image areas into which the characteristic points will move in the next frame T+1. For instance, the lane tracking unit 310 may predict that the characteristic points will be present in image areas 115 and 116 in the next frame, as shown in FIG. 7(b).

The application execution unit 500 detects characteristic points pertaining to the lane marks 111 and 112 in the image captured for the frame T+1 through longitudinal edge detection processing executed by scanning the photographic image along the horizontal direction, as well. The lane tracking unit 310 obtains information indicating the positions and characteristic quantities detected by the application execution unit 500 for the frame T+1 with regard to these characteristic points.

The lane tracking unit 310 makes a decision as to whether or not characteristic points assuming characteristic quantities matching those at the characteristic points corresponding to the lane marks 111 and 112 having been detected for the frame T, have been detected in the image areas 115 and 116. If characteristic points with characteristic quantities matching those at the characteristic points corresponding to the lane marks 111 and 112, having been detected for the frame T, have been detected in the image areas 115 and 116, the lane tracking unit 310 judges that good visibility is assured over the plurality of image blocks B(x, y) included in the image areas 113 through 116. In FIG. 7(c), the plurality of image blocks B(x, y) judged by the lane tracking unit 310 to assure good visibility are enclosed inside bold lines.

The lane tracking unit 310 expresses the levels of visibility in individual blocks B(x, y) as visibility-assured areas V1(x, y). The lane tracking unit 310 increases the values for visibility-assured areas V1(x, y) corresponding to a plurality of image blocks B(x, y) judged to assure good visibility, as shown in FIG. 7(c) by a predetermined value. The lane tracking unit 310 updates the visibility-assured areas V1(x, y) in each frame. The lane tracking unit 310 outputs the visibility-assured areas V1(x, y) updated in each frame to the system suspension decision-making unit 400.

(Road Surface Tracking Unit 320)

Each time the photographic image acquisition unit 100 outputs a photographic image, the road surface tracking unit 320 executes longitudinal edge detection and lateral edge detection by scanning the photographic image along two directions, i.e., the horizontal direction and the vertical direction. Through the longitudinal edge detection executed by scanning the photographic image along the horizontal direction, the road surface tracking unit 320 calculates the luminance difference manifested by each pair of pixels disposed next to each other along the vertical direction and detects a vector with a direction thereof running from a darker pixel to an adjacent brighter pixel. Through the lateral edge detection executed by scanning the photographic image along the vertical direction, the road surface tracking unit 320 calculates the luminance difference manifested by each pair of pixels disposed next to each other along the horizontal direction and detects a vector with a direction thereof running from a darker pixel to an adjacent brighter pixel. The road surface tracking unit 320 generates a composite vector by combining vectors each pointing from a darker pixel to a brighter pixel, detected through the edge detection executed along the two directions in correspondence to each pixel and calculates an edge angle based upon the direction of the composite vector. For instance, a vector pointing from the subject pixel toward the pixel to the left and a vector pointing from the subject pixel toward a pixel directly above may have been detected, and in such a case, the composite vector will assume a direction running toward the upper left and an edge angle of 45° will be calculated.

The road surface tracking unit 320 generates a histogram based upon the edge angles each calculated in correspondence to one of the pixels. This histogram will be referred to as an edge angle histogram. Eight angle ranges, for instance, may be taken in 45° increments in the edge angle histogram.

Figure 8C:
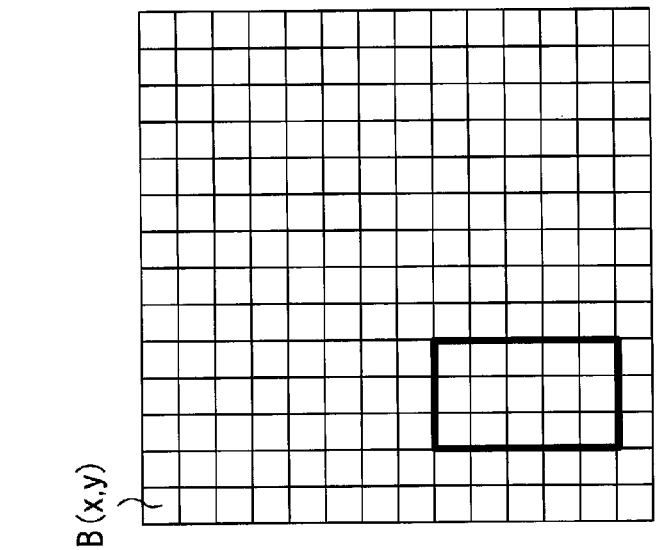

The road surface tracking unit 320 detects edges in a road surface texture area in an edge image generated based upon the image captured in the frame T. In the example presented in FIG. 8(a), the road surface tracking unit 320 detects edges of a road surface texture area 121 in the image captured in the frame T. The road surface texture area 121 may express, for instance, a pattern attributable to dirt on the road surface or marks left after road repair. The road surface tracking unit 320 generates an edge angle histogram $H_T$ for an image area 122 made up with the blocks B(x, y) over which the road surface texture area 121 is present.

Figure 8B:
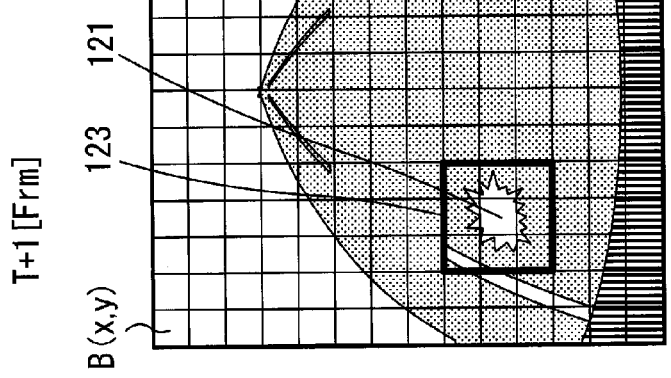
Figure 8A:
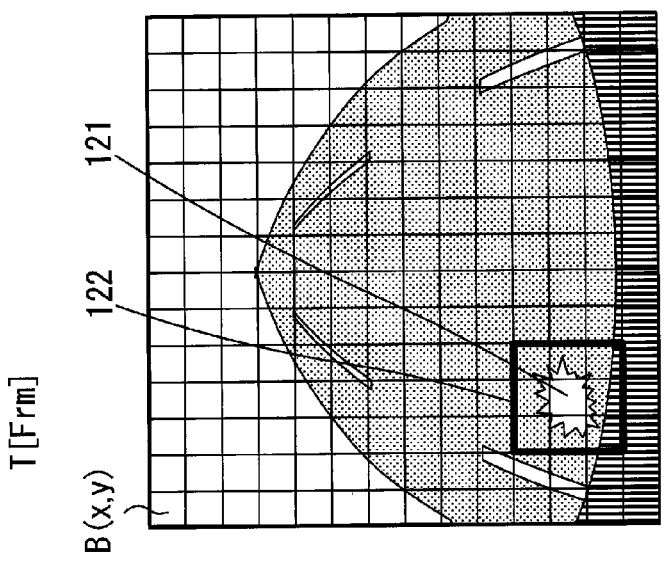

Based upon the traveling speed of the vehicle 9 and the frame rate, the road surface tracking unit 320 estimates the position to be taken by the vehicle 9 at the time point at which the next frame T+1 is captured. Based upon the estimated position the vehicle 9 is predicted to take, the road surface tracking unit 320 predicts image blocks B(x, y) over which the road surface texture area 121 is likely to range in the next frame T+1. FIG. 8(b) presents an example of an image area 123 made up with a plurality of image blocks B(x, y) over which the road surface texture area 121 is predicted to range in the image captured for the next frame T+1.

The road surface tracking unit 320 generates an edge angle histogram $H_{T+1}$ for the image area 123 made up with the blocks B(x, y) over which the road surface texture area 121 is predicted to range in the image captured for the next frame T+1. The road surface tracking unit 320 judges that the road surface texture area 121 on the road surface has been tracked successfully over the frames T and T+1 if the edge angle histogram $H_{T+1}$ matches the edge angle histogram $H_T$. The road surface tracking unit 320 then judges that good visibility is assured over the blocks B(x, y) included in the image areas 122 and 123. In FIG. 8(c), the blocks B(x, y) judged by the road surface tracking unit 320 to assure good visibility are enclosed by the bold lines.

The road surface tracking unit 320 expresses an image block B(x, y) in which good visibility is assured as a visibility-assured area V2(x, y). The road surface tracking unit 320 increases the values for visibility-assured areas V2(x, y) corresponding to the image blocks B(x, y) judged to assure good visibility, as shown in FIG. 8(c), by a predetermined value. The road surface tracking unit 320 updates the visibility-assured areas V2(x, y) in each frame. The road surface tracking unit 320 outputs the visibility-assured areas V2(x, y) updated in each frame to the system suspension decision-making unit 400.

(Three-Dimensional Object Tracking Detection 330)

The three-dimensional object tracking unit 330 generates bird's-eye-view images based upon images captured by the cameras 2a and 2b and tracks three-dimensional objects present around the vehicle 9. The three-dimensional object tracking unit 330 makes a decision as to whether or not a three-dimensional object has been tracked successfully.

Objects appearing to have three dimensions, such as fences, walls and telephone poles, are present around the vehicle 9 traveling on a road. Hereafter, an object assuming a three-dimensional shape will be referred to as a three-dimensional object. A three-dimensional object often includes sides extending upward along the vertical direction. Sides extending upward along the vertical direction run in a radial pattern centered on the camera 2a or 2b in a bird's-eye-view image. The three-dimensional object tracking unit 330 executes radial edge detection in the bird's-eye-view image by setting the camera 2a or 2b at the center of the radial pattern so as to detect characteristic points of a three-dimensional object and recognize the three-dimensional object. The three-dimensional object tracking unit 330 makes a decision as to whether or not a three-dimensional object recognized in a given frame T is recognized again in the next frame T+1. If the three-dimensional object has been tracked successfully, the three-dimensional object tracking unit 330 judges that good visibility is assured with regard to the image areas that include the tracking target object image.

Figure 9:
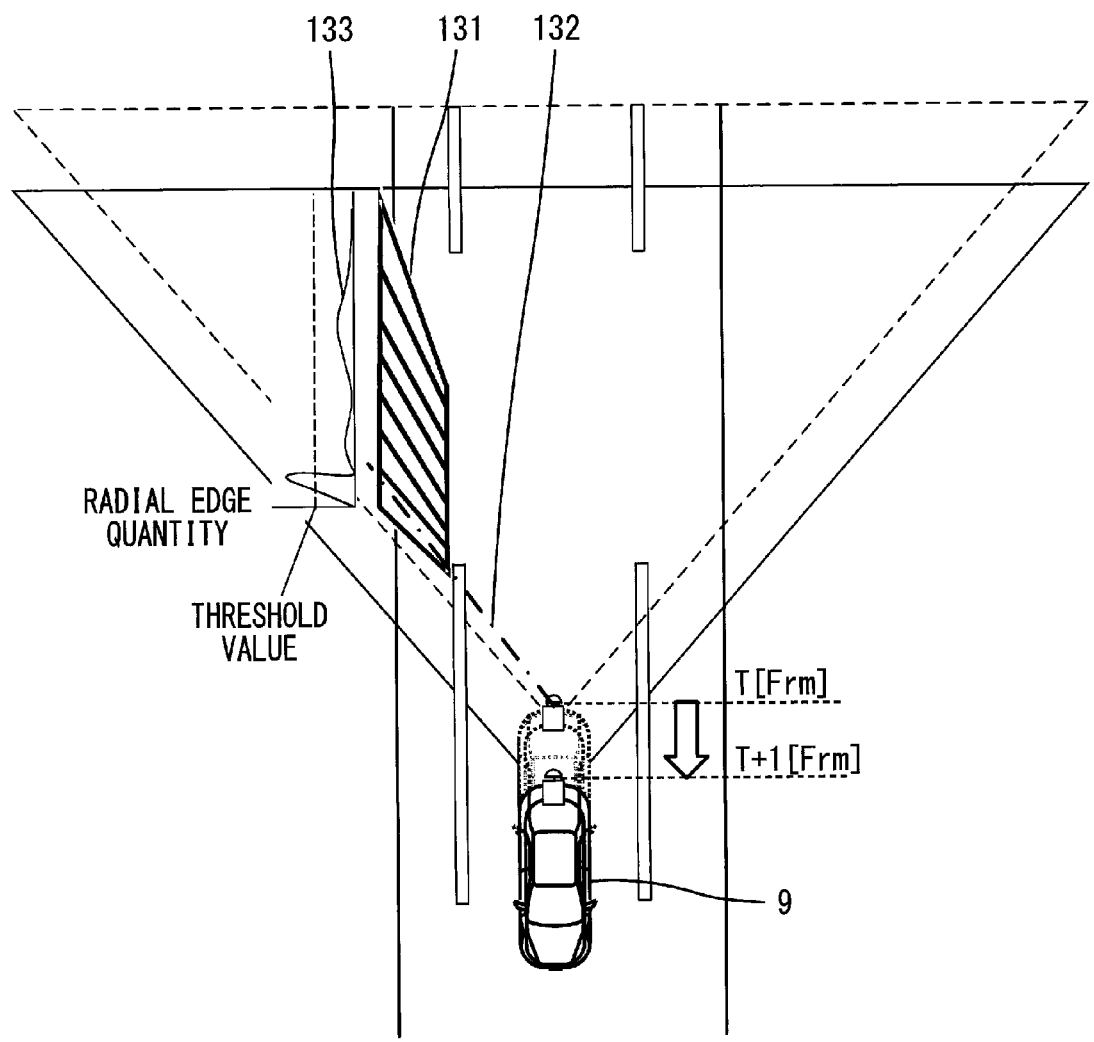

A fence 131 may be present behind and to the right of the vehicle 9 (an upper left position in the figure) as indicated in the schematic bird's-eye-view image in FIG. 9. The camera 2b, which captures images of the space behind the vehicle 9, captures an image such as that shown in FIG. 10(a) for the frame T. The photographic image in FIG. 10(a) is divided into a plurality of image blocks B(x, y). An image of the fence 131 is captured in the photographic image in FIG. 10(a).

The three-dimensional object tracking unit 330 generates a bird's-eye-view image from the photographic image and executes edge detection in the bird's-eye-view image along a radial direction, i.e., along a radial line originating from the camera 2b, such as a one-point chain line 132 in FIG. 9. Radial edge quantities detected in correspondence to the fence 131 through the edge detection may be graphed as in a histogram 133 presented over the bird's-eye-view image in FIG. 9. The three-dimensional object tracking unit 330 recognizes the presence of a three-dimensional object at a position at which an edge quantity equal to or greater than a predetermined threshold value is detected. A value that makes it possible to recognize three-dimensional objects that cyclically appear in the photographic image plane, such as guardrails and soundproof walls on express highways but does not allow three-dimensional objects that do not cyclically appear in the photographic image plane, such as road signs and trees to be recognized, should be selected as the predetermined threshold value.

In FIG. 10(a), a region 134 in the image captured in the frame T, which corresponds to the image area in the bird's-eye-view image where the radial edge quantity equal to or greater than the predetermined threshold value is detected, is enclosed by the bold lines. Based upon the traveling speed of the vehicle 9 and the frame rate, the three-dimensional object tracking unit 330 estimates the position to be taken by the vehicle 9 at the time point at which the next frame T+1 is captured. Based upon the estimated position to which the vehicle 9 is predicted to move, the three-dimensional object tracking unit 330 predicts image blocks B(x, y) over which the image included in the region 134 is likely to range in the next frame T+1. In the example presented in FIG. 10(b), the three-dimensional tracking unit 330 predicts that the image is likely to range over a plurality of image blocks B(x, y) present in an image area 135.

As the image captured in the next frame T+1 such as that shown in FIG. 10(b) is input from the photographic image acquisition unit 100, the three-dimensional object tracking unit 330 generates a bird's-eye-view image based upon the photographic image. The three-dimensional object tracking unit 330 then executes radial edge detection in the bird's-eye-view image with the camera 2b at the center of the radial pattern. If a radial edge quantity equal to or greater than a predetermined value is detected in an image area in the bird's-eye-view image corresponding to the predicted image area 135, the three-dimensional tracking unit 330 decides that the three-dimensional object has been tracked successfully. The three-dimensional object tracking unit 330 judges that good visibility is assured in image blocks B(x, y) each included in at least either the region 134 or the image area 135.

The three-dimensional object tracking unit 330 expresses the level of visibility in each image block B(x, y) as a visibility-assured area V3(x, y). The three-dimensional object tracking unit 330 increases the values for visibility-assured areas V3(x, y) corresponding to image blocks B(x, y) judged to assure good visibility by a predetermined value. The three-dimensional object tracking unit 330 updates the visibility-assured areas V3(x, y) in each frame. The three-dimensional object tracking unit 330 outputs the visibility-assured areas V3(x, y) updated in each frame to the system suspension decision-making unit 400.

(Paint Detection Unit 340)

The paint detection unit 340 recognizes graphics in predetermined shapes drawn on the road surface, such as road signs, in images captured via the cameras 2a and 2b. The paint detection unit 340 recognizes road signs and the like through pattern recognition. The paint detection unit 340 may recognize, for instance, a road sign 141 in a photographic image such as that shown in FIG. 11(a). In FIG. 11(a), an image area 142 made up with blocks B(x, y) over which the image of the road sign 141 recognized in the frame T ranges, is enclosed in bold lines.

Based upon the traveling speed of the vehicle 9, the frame rate and the like, the paint detection unit 340 estimates the position to be taken by the vehicle 9 at the time point at which the next frame T+1 is captured. Based upon the estimated position to which the vehicle 9 is predicted to move, the paint detection unit 340 predicts an image area 143 where the road sign 141 is likely to be detected in the next frame T+1. The paint detection unit 340 makes a decision by adopting a pattern recognition method as to whether or not a road sign 141 identical to that in the frame T is detected in the predicted image area 143, as indicated in FIG. 11(b). If a road sign 141 identical to that in the frame T is detected in the predicted image area 143, the paint detection unit 340 judges that good visibility is assured in the blocks B(x, y) included in the image areas 142 and 143. In FIG. 11(c), the blocks B(x, y) judged to assure good visibility by the paint detection unit 340 are enclosed by the bold lines.

The paint detection unit 340 expresses the level of visibility in each image block B(x, y) as a visibility-assured area V4(x, y). The paint detection unit 340 increases the values for visibility-assured areas V4(x, y) corresponding to image blocks B(x, y) judged to assure good visibility by a predetermined value. The paint detection unit 340 updates the visibility-assured areas V4(x, y) in each frame. The paint detection unit 340 outputs the visibility-assured areas V4(x, y) updated in each frame to the system suspension decision-making unit 400.

(Distance Resolution Checking Unit 350)

The distance resolution of the cameras 2a and 2b becomes lower as the distance to the subject becomes greater. The distance resolution checking unit 350 verifies that the distance resolution of the cameras 2a and 2b becomes lower in correspondence to the distance to the subject. In other words, the distance resolution checking unit 350 verifies that the distance resolution in relation to a subject changes correctly as the vehicle 9 moves and the distance to the subject changes. For instance, the distance resolution checking unit 350 confirms that the distance resolution pertaining to a subject becomes lower as the vehicle 9 pulls away from the subject.

Figure 12A:
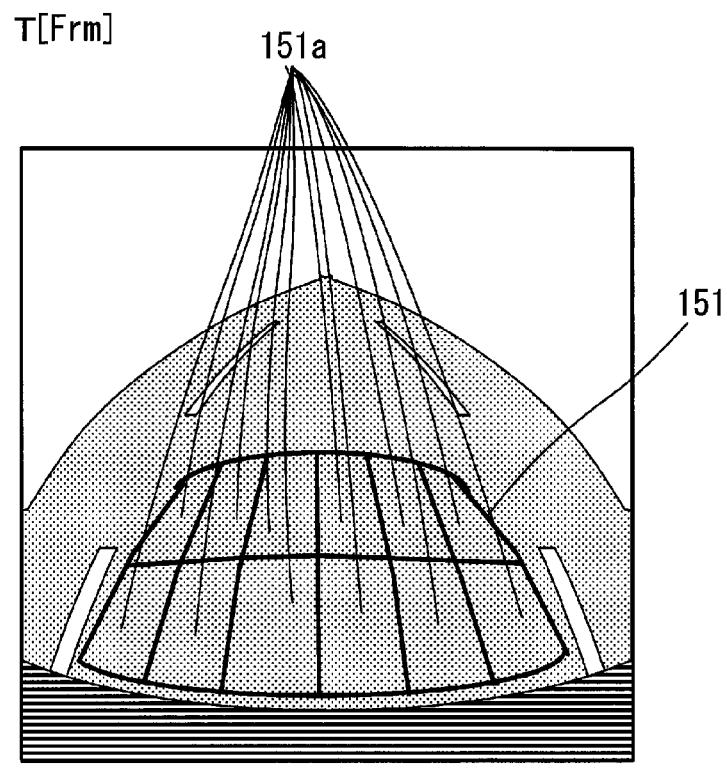
Figure 12B:
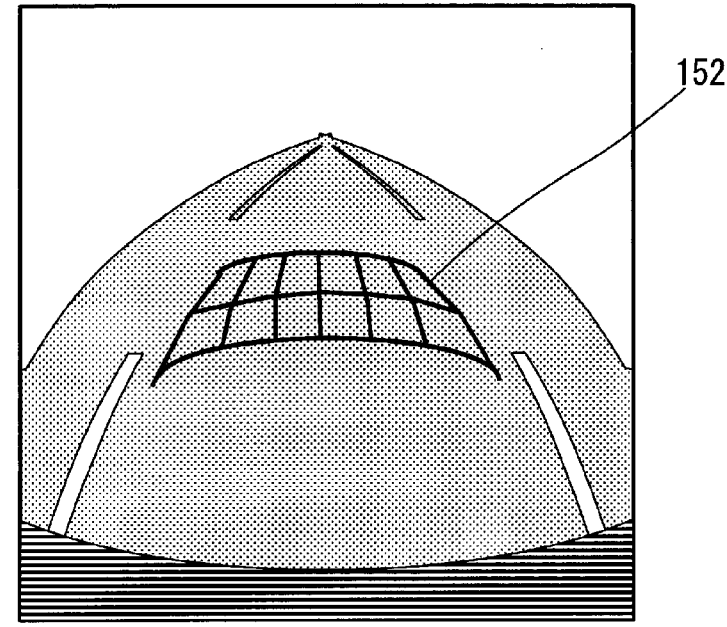

The distance resolution checking unit 350 sets an image area 151 on the road surface in the image captured in the frame T, as shown in FIG. 12(a). The image area 151 includes 2 (down)×6 (across) regions 151a. Based upon the traveling speed of the vehicle 9, the frame rate and the like, the distance resolution checking unit 350 estimates the position to be taken by the vehicle 9 at the time point at which the next frame T+1 is captured. Based upon the estimated position to which the vehicle 9 is predicted to move, the distance resolution checking unit 350 predicts an image area in the image captured in the next frame T+1, which is likely to include the image of the road surface where the image area 151 is set. FIG. 12(b) presents an example of the photographic image in the frame T+1 and an example of the predicted image area 152. The image area 152 includes 2×6 regions each corresponding to one of the regions in the image area 151.

As the image captured in the frame T is output from the photographic image acquisition unit 100, the distance resolution checking unit 350 generates an edge intensity histogram H3 in correspondence to each region 151a in the image area 151. In addition, as the image captured in the frame T+1 is output from the photographic image acquisition unit 100, the distance resolution checking unit 350 generates an edge intensity histogram H4 in correspondence to each region in the image area 152. In the edge intensity histograms H3 and H4, edge intensity levels detected in the corresponding regions are sorted into a plurality of ranges.

As the camera 2b moves away from a given place on the road surface, a pattern or the like present on the road surface becomes crushed in the photographic image due to the diminished distance resolution. This means that when the distance between a spot on the road surface and the camera is greater, the edge intensity detected in relation to that spot on the road surface is lower. The distance resolution checking unit 350 compares the edge intensity histogram H4 generated for each region in the image area 152 with the edge intensity histogram H3 for the corresponding region in the image area 151. For instance, the distance resolution checking unit 350 may make a decision as to whether or not the average value calculated based upon the edge intensity histograms H4 for the individual regions in the image area 152 is smaller than the average value calculated based upon the edge intensity histograms H3 for the corresponding regions 151a in the image area 151. In this case, if the average value representing the edge intensity histograms H4 for the regions in the image area 152 is smaller than the average value representing the edge intensity histograms H3 for the corresponding regions in the image area 151, the distance resolution checking unit 350 judges that good visibility is assured in the blocks B(x, y) over which the image area 151 ranges and in the blocks B(x, y) over which the image area 152 ranges.

The distance resolution checking unit 350 expresses the level of visibility in each image block B(x, y) as a visibility-assured area V5(x, y). The distance resolution checking unit 350 increases the values for visibility-assured areas V5(x, y) corresponding to image blocks B(x, y) judged to assure good visibility by a predetermined value. The distance resolution checking unit 350 updates the visibility-assured areas V5(x, y) in each frame. The distance resolution checking unit 350 outputs the visibility-assured areas V5(x, y) updated in each frame to the system suspension decision-making unit 400.

(System Suspension Decision-Making Unit 400)

Figure 13:
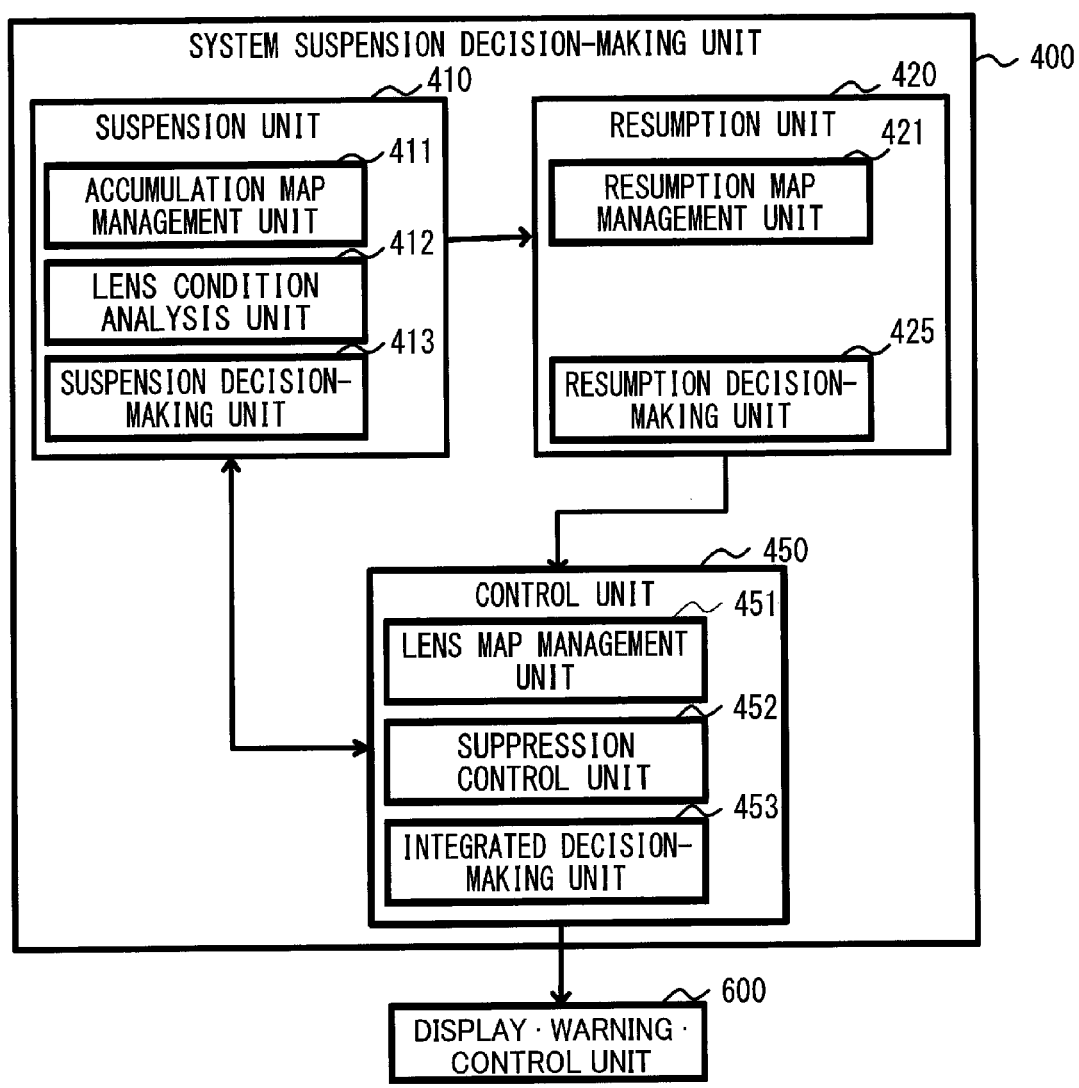

FIG. 13 presents an example of a functional structure that may be adopted in the system suspension decision-making unit 400. The system suspension decision-making unit 400 in the example presented in FIG. 13 includes an suspension unit 410, a resumption unit 420 and a control unit 450.

(Suspension Unit 410)

Based upon the detection results provided by the various units in the accumulation detection unit 200, the suspension unit 410 makes a decision as to whether or not to suspend the operation executed by the application execution unit 500. The suspension unit 410 includes an accumulation map management unit 411, a lens condition analysis unit 412 and a suspension decision-making unit 413.

(Accumulation Map Management Unit 411)

Based upon the normalized scores $NS_1(x, y)$ through $NS_1(x, y)$ and the reliability factors $R_1$ through $R_4$ input thereto from the various units in the accumulation detection unit 200, the accumulation map management unit 411 generates, through arithmetic operation, an accumulation map $M_P(x, y)$ indicating blocks B(x, y) where accumulations are present.

The accumulation map management unit 411 may execute, for instance, the following arithmetic operation. The accumulation map management unit 411 sets the accumulation map $M_P(x, y)$ to the initial value of, for instance, 0. The accumulation map management unit 411 then adds a value representing a predetermined multiple of the normalized score $NS_1(x, y)$ by, for instance, ¼ to the accumulation map $M_P(x, y)$ if the reliability factor $R_1$ input thereto from the water drop detection unit 210 is equal to or greater than a predetermined value. Likewise, the accumulation map management unit 411 adds a value representing a predetermined multiple of the normalized score $NS_2(x, y)$ to the accumulation map $M_P(x, y)$ if the reliability factor $R_2$ input thereto from the clouding detection unit 220 is equal to or greater than a predetermined value. In addition, the accumulation map management unit 411 also adds a value representing a predetermined multiple of the normalized score $NS_3(x, y)$ to the accumulation map $M_P(x, y)$ if the reliability factor $R_3$ input thereto from the water stain detection unit 230 is equal to or greater than a predetermined value. The accumulation map management unit 411 than adds a value representing a predetermined multiple of the normalized score $NS_4(x, y)$ to the accumulation map $M_P(x, y)$ if the reliability factor $R_4$ input thereto from the mud detection unit 240 is equal to or greater than a predetermined value.

The accumulation map $M_P(x, y)$ calculated by the accumulation map management unit 411 indicates the extent of accumulation present at the blocks B(x, y). The accumulation map management unit 411 transmits the accumulation map $M_P(x, y)$ having been generated through calculation to the resumption unit 420 and the control unit 450.

(Lens Condition Analysis Unit 412)

Figure 14:
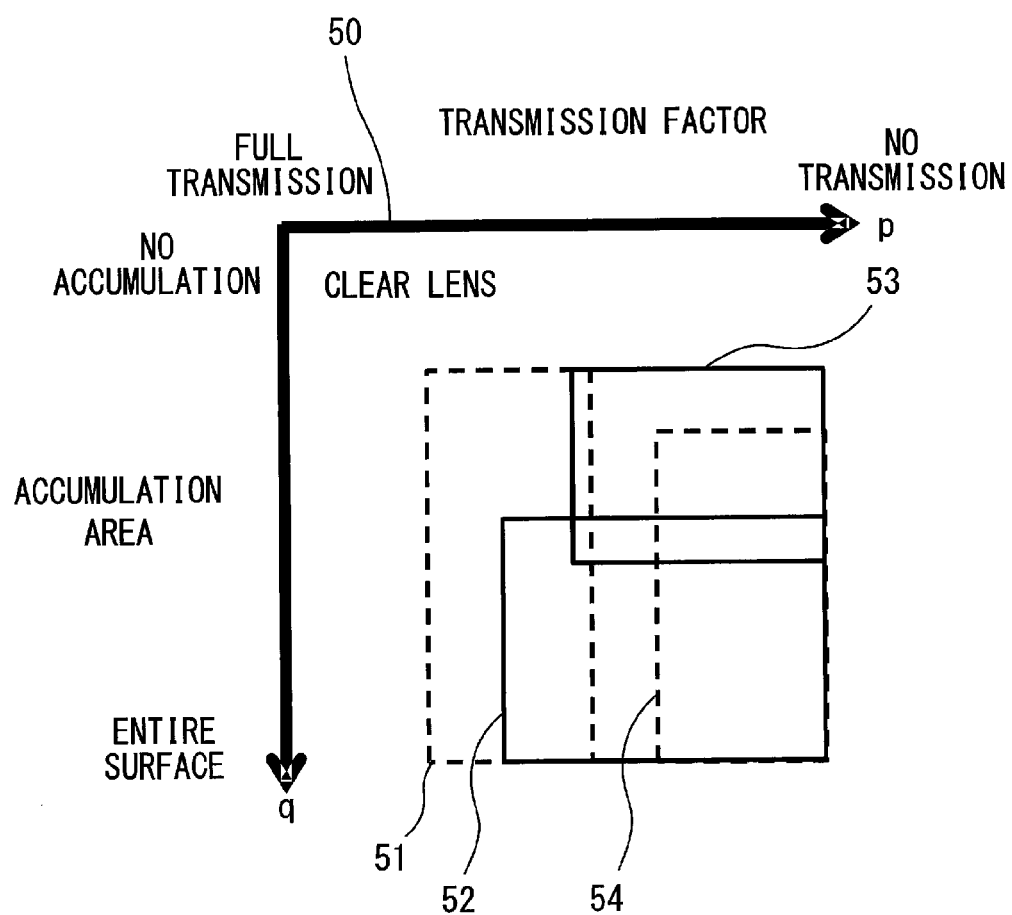

The lens condition analysis unit 412 projects the detection results provided from the various units in the accumulation detection unit 200 into a coordinate space shown in FIG. 14. The coordinate space in FIG. 14 is stored as a control map 50 in the memory 10. In the control map 50, a coordinate axis pertaining to the transmission factor affected by lens dirt accumulation and a coordinate axis pertaining to the accumulation area over which accumulations are built up on the camera lens are assumed. In the control map 50, the lens dirt accumulation transmission factor indicates a higher degree of opacity further away from the origin point. In addition, the accumulation area increases further away from the origin point.

The lens condition analysis unit 412 executes an arithmetic operation as expressed in (1) by using the normalized scores $NS_1(x, y)$ through $NS_4(x, y)$ input thereto from the various units in the accumulation detection unit 200 so as to calculate coordinates (M(x), M(y)) on the control map 50.

M(x) is an index indicating the transmission factor of the lens in either of the cameras 2a or 2b, and a greater value taken for M(x) indicates that the particular camera lens is less transmissive. M(y) is an index indicating the accumulation area over which there is accumulation, and a value 0.0 is taken for M(y) if no accumulation is present at the lens, whereas a value 1.0 is taken for M(y) if an accumulation is present over the entire lens surface. It is to be noted that values determined in advance are used for the coefficients a1, a2, a3, a4, sx, b1, b2, b3, b4 and sy and that they are set so that the values taken for M(x) and M(y) are each equal to or greater than 0.0 and equal to or less than 1.0.

[Math. 1]

$$\begin{bmatrix} M(x) \\ M(y) \\ 1 \end{bmatrix} = \begin{bmatrix} a1 & a2 & a3 & a4 & sx \\ b1 & b2 & b3 & b4 & sy \\ 0 & 0 & 0 & 0 & 1 \end{bmatrix} \begin{bmatrix} NS_1(x,y) \\ NS_2(x,y) \\ NS_3(x,y) \\ NS_4(x,y) \\ 1 \end{bmatrix} \quad (1)$$

Furthermore, a water drop range 51 and a mud range 54, each indicated as a dotted-line rectangle, and a clouding range 52 and a water stain range 53, each indicated as a solid-line rectangle, are set in advance in the control map 50. If the dirt at the camera lens is simply water drops, the coordinates (M(x), M(y)) indicate a position inside the water drop range 51. Likewise, if the dirt at the camera lens is simply clouding, the coordinates (M(x), M(y)) indicate a position inside the clouding range 52. In addition, if the dirt at the camera lens is simply water stains, the coordinates (M(x), M(y)) indicate a position inside the water stain range 53. If the dirt at the camera lens is simply mud, the coordinates (M(x), M(y)) indicate a position inside the mud range 54. The lens condition analysis unit 412 transmits the coordinates (M(x), M(y)) calculated as expressed in (1) to the suspension decision-making unit 413 and the resumption unit 420.

(Suspension Decision-Making Unit 413)

The suspension decision-making unit 413 makes a decision as to whether or not detection of lane marks, other vehicles, pedestrians, road signs, parking frames and the like, executed by the application execution unit 500, is to be suspended. The suspension decision-making unit 413 makes an affirmative decision so as to suspend the detection by the application execution unit 500 when the following condition (C1), for instance, exists.

(C1) Even if the dirt removing unit 640 is engaged for accumulation removal repeatedly over a predetermined number of times or more after the control unit 450 outputs, based upon the coordinates (M(x), M(y)) calculated by the lens condition analysis unit 412, a processing execution command for processing execution in an erroneous detection countermeasure third suppression mode or a non-detection countermeasure third suppression mode, the coordinates (M(x), M(y)) do not move closer to the origin point in the control map 50.

(Resumption Unit 420)

The resumption unit 420 restores the application execution unit 500 from the suspended state. The resumption unit 420 includes a resumption map management unit 421 and a resumption decision-making unit 425.

(Resumption Map Management Unit 421)

The resumption map management unit 421 generates a resumption map $M_R(x, y)$ through an arithmetic operation executed as expressed in (2) by using the corresponding visibility-assured areas V1(x, y), V2(x, y), V3(x, y), V4(x, y) and V5(x, y) input thereto from the various units in the tracking unit 300.

$$M_R(x,y)=V1(x,y)+V2(x,y)+V3(x,y)+V4(x,y)+V5(x,y) \quad (2)$$

A greater value calculated for the resumption map $M_R(x, y)$ indicates that a lens surface area corresponding to the image in the particular block B(x, y) is cleaner with less accumulation.

(Resumption Decision-Making Unit 425)

The resumption decision-making unit 425 makes a decision as to whether or not to restore the application execution unit 500 from the suspended state based upon the accumulation map $M_P(x, y)$ output by the accumulation map management unit 411, the coordinates (M(x), M(y)) output by the lens condition analysis unit 412 and the resumption map $M_R(x, y)$ generated by the resumption map management unit 421.

The resumption decision-making unit 425 makes an affirmative decision so as to restore the application execution unit 500 from the suspended state if the following conditions (C3), (C4) and (C5) all exist.

(C3) The average value calculated for the accumulation maps $M_P(x, y)$ corresponding to all the blocks B(x, y) indicates a decreasing tendency.

(C4) The coordinates (M(x), M(y)) have moved closer to the origin point of the control map 50 continuously over a length of time equal to or greater than a predetermined time length.

(C5) The camera lens dirt condition has improved to such an extent that the tracking unit 300 is now able to correctly recognize tracking targets such as lane marks and reflections off the road surface.

The resumption decision-making unit 425 makes a decision with regard to the condition (C4) by making a decision as to whether or not the distance between the coordinates (M(x), M(y)) and the origin point of the control map 50 has become smaller over the predetermined time length. Namely, the resumption decision-making unit 425 makes a decision as to whether or not at least either M(x) or M(y) has become smaller during the predetermined time length without the other ever taking a greater value during the predetermined time length.

The resumption decision-making unit 425 may make a decision with regard to the condition (C5) by making a decision as to whether or not an average value $\Sigma_x \Sigma_y$ by $M_R(x, y)/N_B$ of the resumption map $M_R(x, y)$ is equal to or greater than a first predetermined threshold value or by making a decision as to whether or not the total sum $\Sigma_x \Sigma_y$ $M_R(x, y)$ of the resumption map $M_R(x, y)$ is equal to or greater than a second predetermined threshold value. It is to be noted that $N_B$ represents the total number of blocks B(x, y).

(Control Unit 450)

Based upon outputs from the various units in the suspension unit 410 and the various units in the resumption unit 420, the control unit 450 determines an image area to be used by the application execution unit 500 for image recognition. The control unit 450 expresses an image area that is not used for image recognition by the application execution unit 500 with a lens map $M_L(x, y)$.

The control unit 450 includes a lens map management unit 451, a suppression control unit 452 and an integrated decision-making unit 453.

The lens map management unit 451 updates the lens map $M_L(x, y)$ through a method that will be explained later in reference to a flowchart based upon the accumulation map $M_P(x, y)$ generated by the accumulation map management unit 411 and the resumption map $M_R(x, y)$ generated by the resumption map management unit 421.

The lens map $M_L(x, y)$ indicates detection areas used when the various units in the application execution unit 500 are engaged in operation to detect lane marks, other vehicles, pedestrians, road signs, parking frames and the like. Any block B(x, y) with the lens map $M_L(x, y)$ thereof equal to or greater than a predetermined value, for instance, is not included in a detection area.

Based upon the coordinates (M(x), M(y)) output by the lens condition analysis unit 412, the suppression control unit 452 makes decisions pertaining to suppression mode switchover at the various units in the application execution unit 500.

Figure 15:
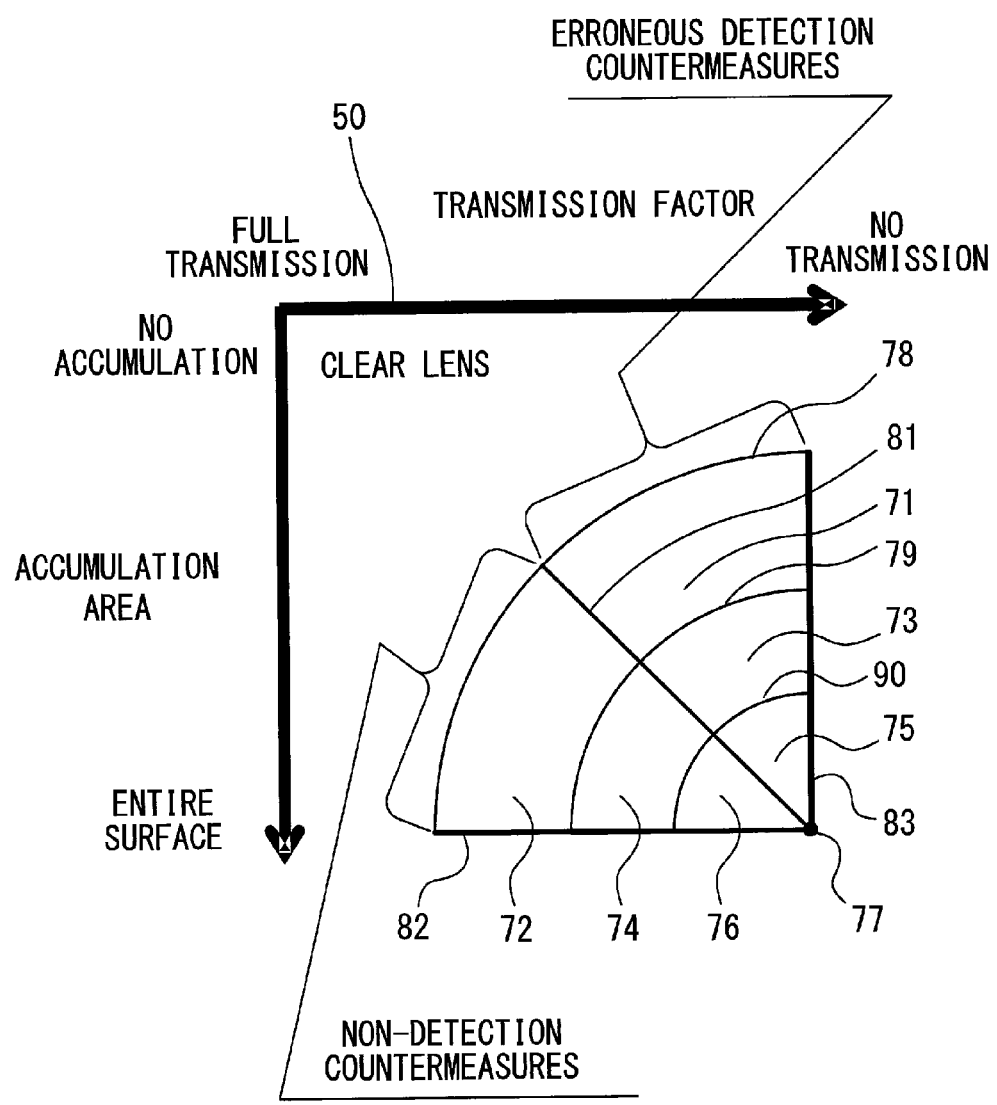

As FIG. 15 indicates, six operation selection ranges 71, 72, 73, 74, 75 and 76 are set in the control map 50. FIG. 15 shows coordinates 77 located furthest away from the origin point among the coordinates that may result from the projection conversion at the lens condition analysis unit 412 and three quarter circles 78, 79 and 80 centered on the coordinates 77. In the following description, the coordinates 77 will be referred to as a worst dirt build-up point 77. Among the quarter circles 78, 79 and 80, the quarter circle 78 assumes the greatest radius, the quarter circle 79 assumes the second largest radius and the quarter circle 80 assumes the smallest radius. In addition, a line segment 81 dividing each of the quarter circles 78, 79 and 80 into two equal portions, a line segment 82 extending parallel to the coordinate axis pertaining to the transmission factor and a line segment 83 extending parallel to the coordinate axis pertaining to the accumulation area are drawn out from the worst dirt build-up point 77 in FIG. 15.

(Erroneous Detection Countermeasures)

The operation selection range 71, set at a position closer to the transmission factor coordinate axis rather than to the accumulation area coordinate axis, is enclosed by the circumference of the quarter circle 78, the circumference of the quarter circle 79, the line segment 81 and the line segment 83. When the coordinates (M(x), M(y)) fall within the range defined as the operation selection range 71, the suppression control unit 452 outputs an execution command for the application execution unit 500 so as to engage the application execution unit 500 in processing in an erroneous detection countermeasure first suppression mode.

The operation selection range 73, set at a position closer to the transmission factor coordinate axis rather than to the accumulation area coordinate axis, is enclosed by the circumference of the quarter circle 79, the circumference of the quarter circle 80, the line segment 81 and the line segment 83. When the coordinates (M(x), M(y)) fall within the range defined as the operation selection range 73, the suppression control unit 452 outputs an execution command for the application execution unit 500 so as to engage the application execution unit 500 in processing in an erroneous detection countermeasure second suppression mode.

The operation selection range 75, set at a position closer to the transmission factor coordinate axis rather than to the accumulation area coordinate axis, is enclosed by the circumference of the quarter circle 80, the line segment 81 and the line segment 83. When the coordinates (M(x), M(y)) fall within the range defined as the operation selection range 75, the suppression control unit 452 outputs an execution command for the application execution unit 500 so as to engage the application execution unit 500 in processing in an erroneous detection countermeasure third suppression mode.

(Non-Detection Countermeasures)

The operation selection range 72, set at a position closer to the accumulation area coordinate axis rather than to the transmission factor coordinate axis, is enclosed by the circumference of the quarter circle 78, the circumference of the quarter circle 79, the line segment 81 and the line segment 82. When the coordinates (M(x), M(y)) fall within the range defined as the operation selection range 72, the suppression control unit 452 outputs an execution command for the application execution unit 500 so as to engage the application execution unit 500 in processing in a non-detection countermeasure first suppression mode.

The operation selection range 74, set at a position closer to the accumulation area coordinate axis rather than to the transmission factor coordinate axis, is enclosed by the circumference of the quarter circle 79, the circumference of the quarter circle 80, the line segment 81 and the line segment 82. When the coordinates (M(x), M(y)) fall within the range defined as the operation selection range 74, the suppression control unit 452 outputs an execution command for the application execution unit 500 so as to engage the application execution unit 500 in processing in a non-detection countermeasure second suppression mode.

The operation selection range 76, set at a position closer to the accumulation area coordinate axis rather than to the transmission factor coordinate axis, is enclosed by the circumference of the quarter circle 80, the line segment 81 and the line segment 82. When the coordinates (M(x), M(y)) fall within the range defined as the operation selection range 76, the suppression control unit 452 outputs an execution command for the application execution unit 500 so as to engage the application execution unit 500 in processing in a non-detection countermeasure third suppression mode.

In other words, the suppression control unit 452 determines whether to take the erroneous detection countermeasures or the non-detection countermeasures based upon whether the coordinates (M(x), M(y)) are closer to the transmission factor coordinate axis or to the accumulation area coordinate axis. In addition, the suppression control unit 452 determines a specific phase of suppression mode in which the particular countermeasures are to be taken based upon the distance between the worst dirt build-up point 77 and the coordinates (M(x), M(y)).

(Integrated Decision-Making Unit 453)

The integrated decision-making unit 453 determines, based upon the decision made by the suppression control unit 452, the decision-making results provided by the suspension decision-making unit 413 and the decision-making results provided by the resumption decision-making unit 425, a command, indicating whether the operations by the various units in the application execution unit 500 are to be suspended or resumed, a suppression mode to be selected and the like, and transmits the command that determined to the application execution unit 500. In addition, the integrated decision-making unit 453 records a history pertaining to the decision made by the suppression control unit 452, the decision-making results provided by the suspension decision-making unit 413, the decision-making results provided by the resumption decision-making unit 425 and the command transmitted to the application execution unit 500 into the memory 10 or the like.

The integrated decision-making unit 453 also outputs information pertaining to suspend/resume states at the various units in the application execution unit 500 to the interface unit 600. For instance, the operations at the various units in the application execution unit 500 may have been suspended, and in such a case, the integrated decision-making unit transmits information, indicating that the operations at the various units have been suspended, to the warning unit 610 so as to prompt the warning unit 610 to output a warning. In addition, if the various units in the application execution unit 500 have been restored from the suspended state, the integrated decision-making unit 453 prompts the warning unit 610 to stop the warning.

(Application Execution Unit 500)

Figure 16:
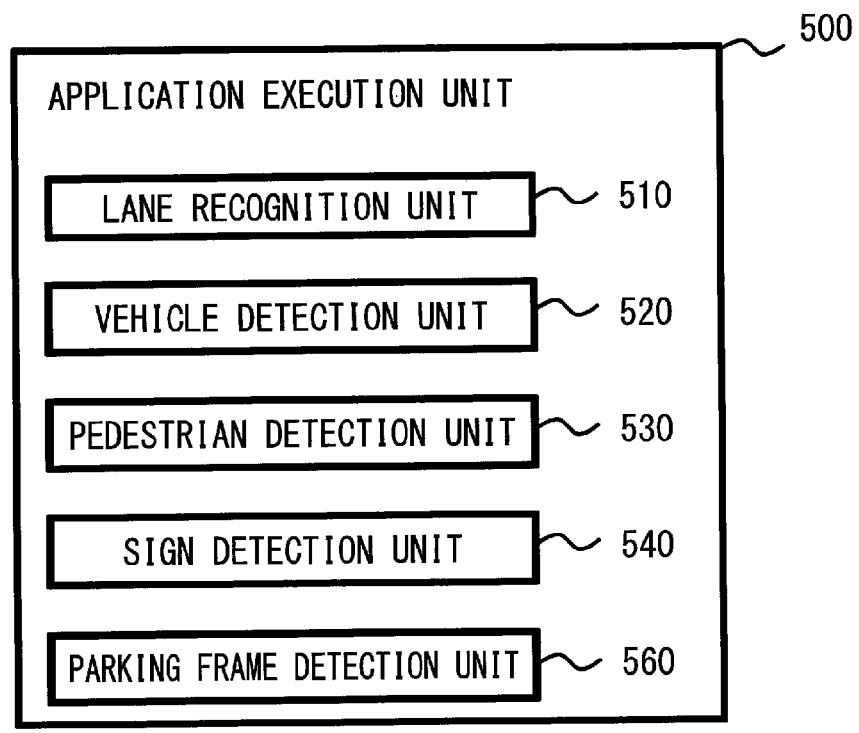

FIG. 16 presents an example of a functional structure that may be adopted in the application execution unit 500. The application execution unit 500 in the example presented in FIG. 16 includes a lane recognition unit 510, a vehicle detection unit 520, a pedestrian detection unit 530, a sign detection unit 540 and a parking frame detection unit 560.

(Lane Recognition Unit 510)

In reference to FIG. 17 and FIG. 18, the operation executed by the lane recognition unit 510 when neither the erroneous detection countermeasures nor the non-detection countermeasures are taken will be described.

Figure 17:
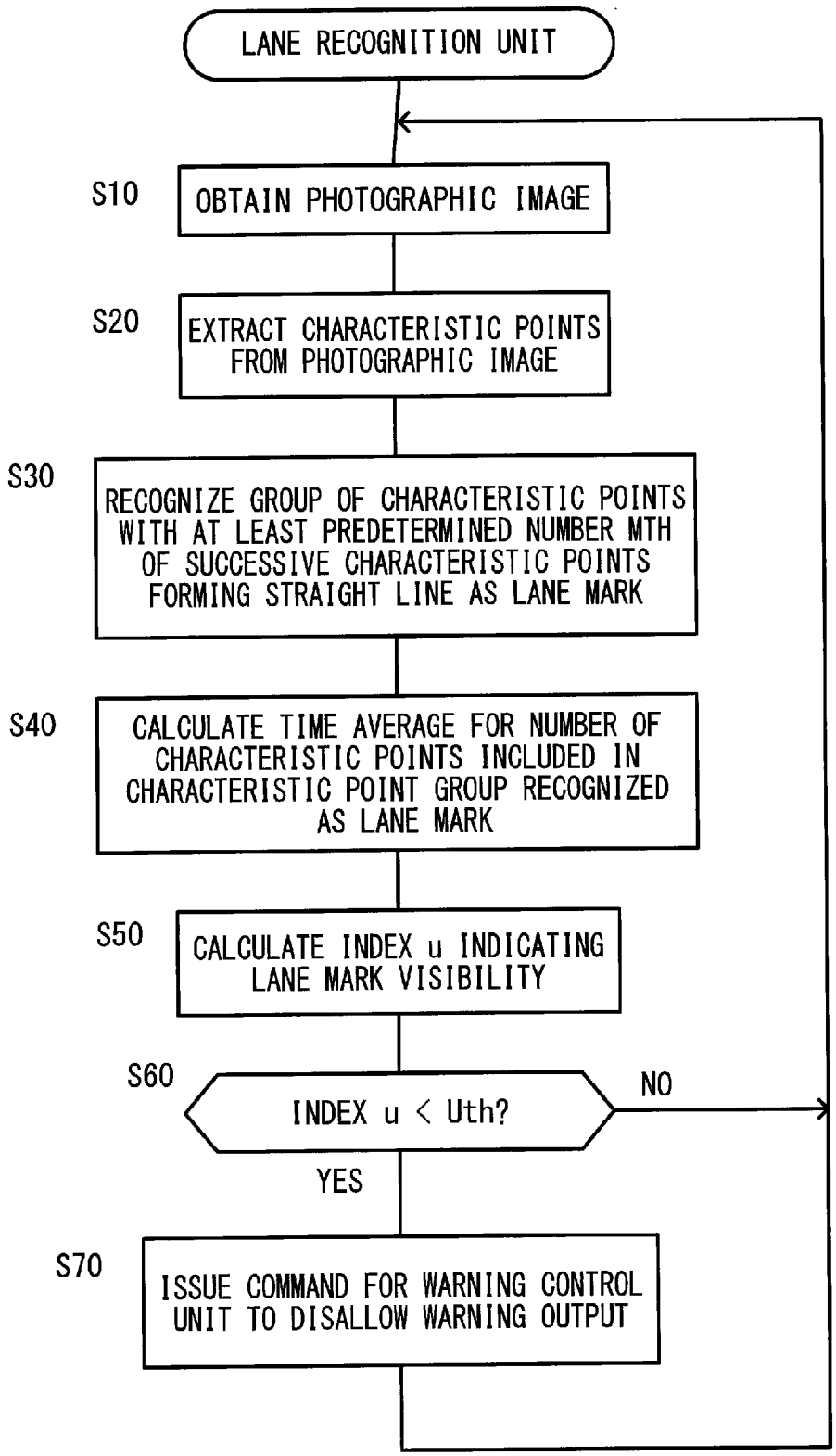

FIG. 17 presents a flowchart pertaining to the processing executed by the lane recognition unit 510. In step S10, the lane recognition unit 510 obtains photographic images from the cameras 2a and 2b. In step S20, the lane recognition unit 510 extracts, from the photographic images having been obtained in step S10, characteristic points that correspond to lane marks drawn to the left and to the right of the lane in which the subject vehicle 9 is traveling on the road. The lane recognition unit 510 sets an extraction area over, for instance, a pre-determined portion of each photographic image and extracts edge points, manifesting luminance changes by extents equal to or greater than a predetermined threshold value, within the extraction area as characteristic points.

Figure 18:
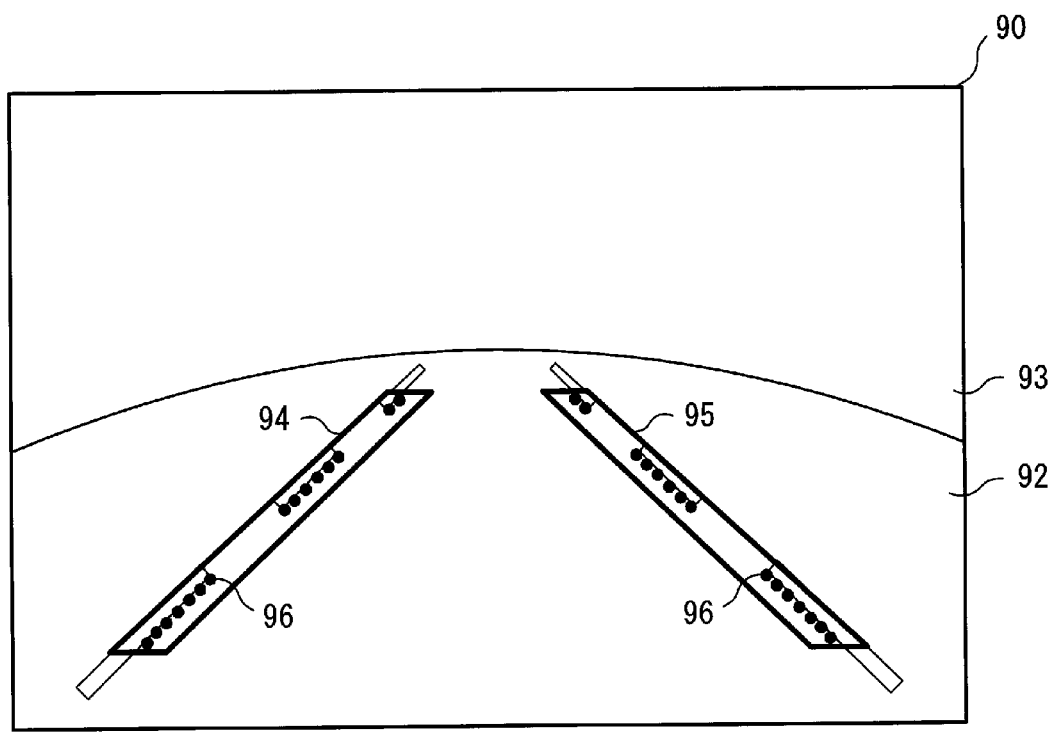

FIG. 18 presents an example of characteristic points that may have been extracted from a photographic image. A photographic image 90 in FIG. 18 includes a road surface image area 92 where the road surface is captured and a background image area 93 where the background is captured. In step S20 in FIG. 17, the lane recognition unit 510 sets an extraction area 94 corresponding to an area further inwards relative to the lane demarcation line located to the right of the subject vehicle 9 and an extraction area 95 corresponding to an area further inward relative to the lane demarcation line located to the left of the subject vehicle 9, as indicated in FIG. 18. It then detects edge points by comparing the luminance values at pixels next to each other within the extraction areas 94 and 95 and extracts the detected edge points as characteristic points 96. As a result, a plurality of characteristic points are extracted along the inner edge line for each of the lane marks drawn on the left side and the right side.

In step S30 in FIG. 17, the lane recognition unit 510 recognizes a group of characteristic points, among the characteristic points having been extracted in step S20, made up with at least a predetermined quantity $N_{th}$ of characteristic points strung together along a single straight line, as a lane mark. In the example presented in FIG. 18, 11 characteristic points 96 are set successively along a single straight line in each of the extraction areas, i.e., the extraction area 94 and the extraction area 95. For instance, the predetermined quantity $N_{th}$ may be 5, and in such a case, the characteristic point groups in extraction areas 94 and 95 in the example presented in FIG. 18 are each recognized as a lane mark. The lane recognition unit 510 outputs information pertaining to the lane marks having been recognized in step S30 to the interface unit 600 and the like.

In step S40, the lane recognition unit 510 calculates a time average of the quantity of characteristic points included in each characteristic point group having been recognized as lane marks in step S30. For instance, records pertaining to the quantities of characteristic points included in the individual characteristic point groups having been recognized as lane marks in previous frames may be stored in the memory 10 and in such a case, the lane recognition unit 510 is able to calculate the time averages for the characteristic point quantities based upon these records.

In step S50, the lane recognition unit 510 calculates an index u representing the visibility of lane marks based upon the time average of the characteristic point quantities having been calculated in step S40. In step S60, the lane recognition unit 510 makes a decision as to whether or not the index u representing the lane mark visibility is less than a predetermined threshold value $U_{th}$. If an affirmative decision is made in step S60, i.e., if the index u is less than the predetermined threshold value $U_{th}$, the lane recognition unit 510 proceeds to execute the processing in step S70. If, on the other hand, a negative decision is made in step S60, i.e., if the index u is equal to or greater than the predetermined threshold value $U_{th}$, the lane recognition unit 510 proceeds to execute the processing in step S10 to obtain images captured for the succeeding frame from the cameras 2a and 2b.

In step S70, the lane recognition unit 510 outputs a command for the control unit 450 so as to ensure that no warning that the vehicle 9 is about to leave the lane is output from the warning unit 610 (see FIG. 2), and then proceeds to the processing in step S10. In step S10, the lane recognition unit 510 obtains images captured for the succeeding frame from the cameras 2a and 2b.

In the erroneous detection countermeasures taken in the first suppression mode, an operation control unit 15 sets the pre-determined quantity $N_{th}$ to a large value. As a result, the lane recognition unit 510 will not readily recognize a group of characteristic points strung together along a single straight line as a lane mark in step S30. In addition, it increases the value set for the threshold value $U_{th}$ so as to ensure that an erroneous warning is not output readily. The values set for the pre-determined quantity $N_{th}$ and the threshold value $U_{th}$ may be changed based upon the position defined by the coordinates (M(x), M(y)).

In the non-detection countermeasures taken in the first suppression mode, the operation control unit 15 sets the pre-determined quantity $N_{th}$ to a small value. As a result, the lane recognition unit 510 will readily recognize a group of characteristic points strung together along a single straight line as a lane mark in step S30. In addition, it sets a smaller value for the threshold value $U_{th}$ so as to ensure that the warning unit 610 is able to more readily output a warning. The values set for the pre-determined quantity $N_{th}$ and the threshold value $U_{th}$ may be changed based upon the position defined by the coordinates (M(x), M(y)).

In the erroneous detection countermeasures taken in the second suppression mode, the operation control unit 15 sets the pre-determined quantity $N_{th}$ to an even larger value relative to the value set for the first suppression mode. As a result, the lane recognition unit 510 will even less readily recognize a group of characteristic points strung together along a single straight line as a lane mark. In addition, the surrounding environment recognition device 1 ensures that any area where an accumulation has been detected is not included in an image area designated as a target of the characteristic point extraction processing executed in step S20 or exempts any characteristic point, among the characteristic points having been extracted in step S20 that has been extracted from an area where an accumulation has been detected.

In the non-detection countermeasures taken in the second suppression mode, the operation control unit 15 sets the pre-determined quantity $N_{th}$ to an even smaller value relative to that set for the first suppression mode. As a result, the lane recognition unit 510 will even more readily recognize a group of characteristic points strung together along a single straight line as a lane mark.

In the erroneous detection countermeasures taken in the third suppression mode and in the non-detection countermeasures taken in the third suppression mode, the operation control unit 15 outputs a command for the dirt removing unit 640 so as to remove accumulations from the camera lens. If the dirt build-up conditions at the camera lens do not improve in spite of the accumulation removal operation executed by the dirt removing unit 640, the suspension decision-making unit 431 suspends the lane recognition by the lane recognition unit 510.

It is to be noted that the processing executed by the parking frame recognition unit 560 in order to recognize parking frames is similar to the processing executed by the lane recognition unit 510 in order to recognize lane marks as has been described in reference to FIG. 18. In addition, the erroneous detection countermeasures and the non-detection countermeasures taken by the parking frame recognition unit 560 in the various suppression modes may be similar to the erroneous detection countermeasures and the non-detection countermeasures taken by the lane recognition unit 510 in the corresponding suppression modes.

(Vehicle Detection Unit 520)

Figure 19:
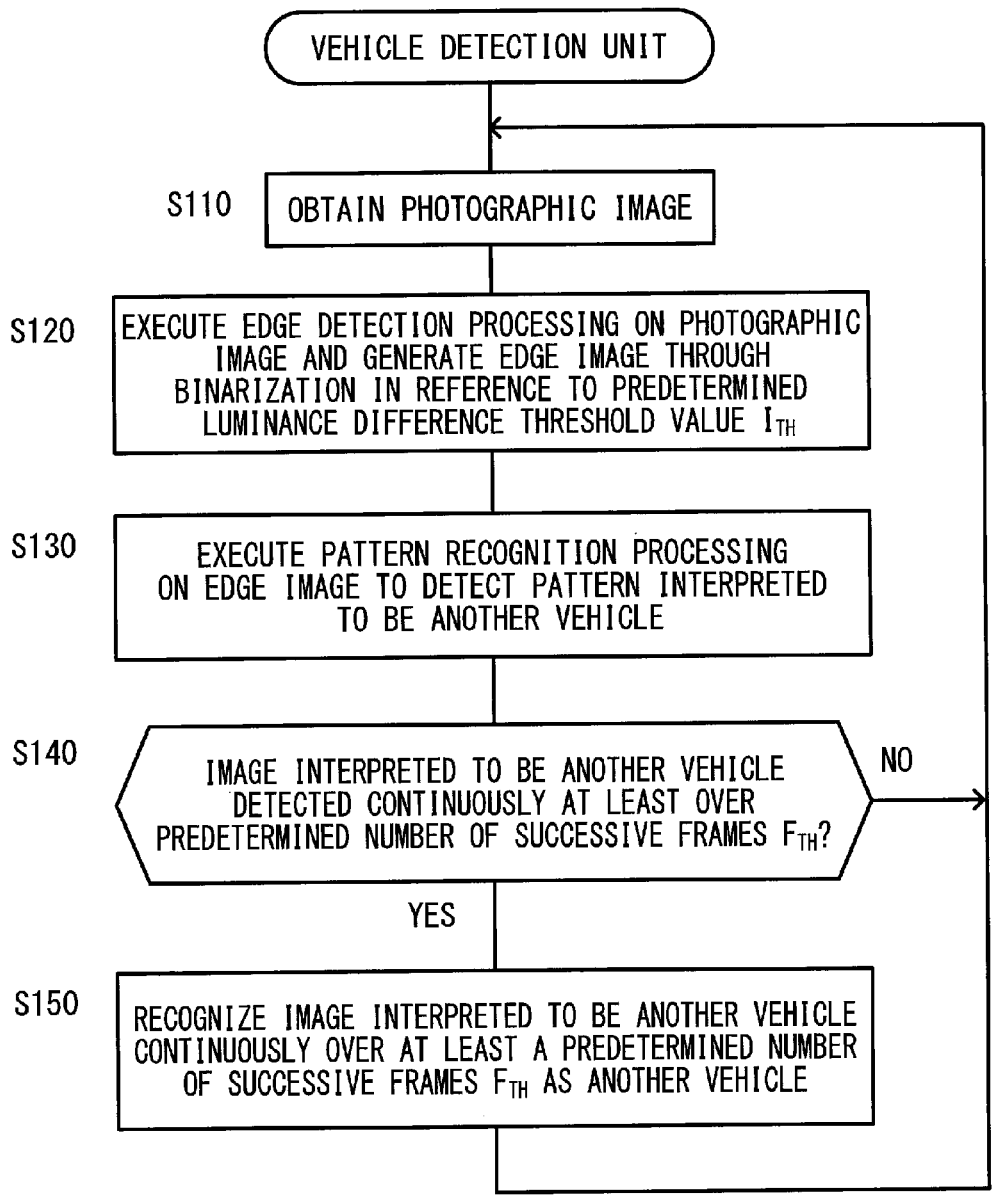

In reference to FIG. 19, the operation executed by the vehicle detection unit 520 when neither the erroneous detection countermeasures nor the non-detection countermeasures are taken will be described. FIG. 19 presents a flowchart pertaining to the processing executed by the vehicle detection unit 520.

In step S110, the vehicle detection unit 520 obtains photographic images from the cameras 2a and 2b. In step S120, the vehicle detection unit 520 executes edge detection processing for each photographic image having been obtained in step S110 and generates an edge image by binarizing the edge detection data in reference to a threshold value $I_{th}$ representing a predetermined luminance difference. In step S130, the vehicle detection unit 520 executes pattern recognition processing for the edge image having been generated in step S120 so as to detect an image that can be assumed to express another vehicle.

In step S140, the vehicle detection unit 520 makes a decision as to whether or not an image assumed to express another vehicle has been detected through step S130 over at least a predetermined number of successive frames $F_{th}$. If a negative decision is made in step S140, i.e., if an image assumed to express another vehicle has not been detected over at least the predetermined number of successive frames $F_{th}$, the vehicle detection unit 520 proceeds to step S110 to obtain images captured for the succeeding frame. If an affirmative decision is made in step S140, i.e., if an image assumed to express another vehicle has been detected over at least the predetermined number of successive frames $F_{th}$, the vehicle detection unit 520 proceeds to execute the processing in step S150. In step S150, the vehicle detection unit 520 recognizes the image assumed to express another vehicle over at least the predetermined number of successive frames $F_{th}$ as another vehicle. Subsequently, the vehicle detection unit 520 proceeds to step S110 to obtain images captured for the succeeding frame.

In the erroneous detection countermeasures taken in the first suppression mode, the control unit 450 sets a greater value for the predetermined number of frames $F_{th}$. By raising the value set for the predetermined number of frames $F_{th}$, it is ensured that the vehicle detection unit 520 will not readily recognize the image having been assumed to express another vehicle in step S120 as another vehicle and thus, the likelihood of erroneous detection of another vehicle is lowered.

In the non-detection countermeasures taken in the first suppression mode, the control unit 450 sets a smaller value for the threshold value $I_{th}$ representing the predetermined luminance difference. As the value set for the threshold value $I_{th}$ representing the predetermined luminance difference is reduced, edges outlining another vehicle can be more readily detected and thus, the risk of another vehicle not being detected by the vehicle detection unit 520 is lowered. The value set for the threshold value $I_{th}$ representing the predetermined luminance difference may be altered based upon the position corresponding to the coordinates (M(x), M(y)).

In the erroneous detection countermeasures taken in the second suppression mode, the control unit 450 excludes any area where an accumulation has been detected from the image area designated as the target for the processing executed in step S120 and step S130. In addition, the control unit 450 limits other vehicles to be detected by the vehicle detection unit 520 to vehicles posing high levels of risk to the subject vehicle 9 and exempts any other vehicle from detection. For instance, it may designate, as a detection target, only another vehicle traveling ahead of the subject vehicle 9 in the same lane in the images captured via the camera 2a. In addition, it made designate, as a detection target, a vehicle traveling in the same lane as the subject vehicle 9 and moving closer to the subject vehicle 9 in the images captured via the camera 2b.

In the non-detection countermeasures taken in the second suppression mode, the control unit 450 sets an even smaller value for the threshold value $I_{th}$ representing the predetermined luminance difference relative to the value set for the first suppression mode. As an alternative, the vehicle detection unit 520 may adopt another vehicle recognition method through which characteristic quantities representing characteristics of another vehicle can be detected even when the contrast in the photographic images is low.

In the erroneous detection countermeasures taken in the third suppression mode and in the non-detection countermeasures taken in the third suppression mode, the control unit 450 outputs a command for the dirt removing unit 640 so as to remove accumulations from the camera lens. If the dirt build-up condition at the camera lens does not improve in spite of the accumulation removal operation executed by the dirt removing unit 640, the control unit 450 suspends the vehicle recognition by the vehicle detection unit 520.

It is to be noted that the processing executed by the pedestrian detection unit 530 and the sign detection unit 540 respectively to recognize a pedestrian and a road sign is similar to the processing executed by the vehicle detection unit 520 in order to recognize another vehicle as has been described in reference to FIG. 19. In addition, the erroneous detection countermeasures and the non-detection countermeasures taken by the pedestrian detection unit 530 and the sign detection unit 540 in the various suppression modes may be similar to the erroneous detection countermeasures and the non-detection countermeasures taken by the vehicle detection unit 520 in the corresponding suppression modes.

Figure 20:
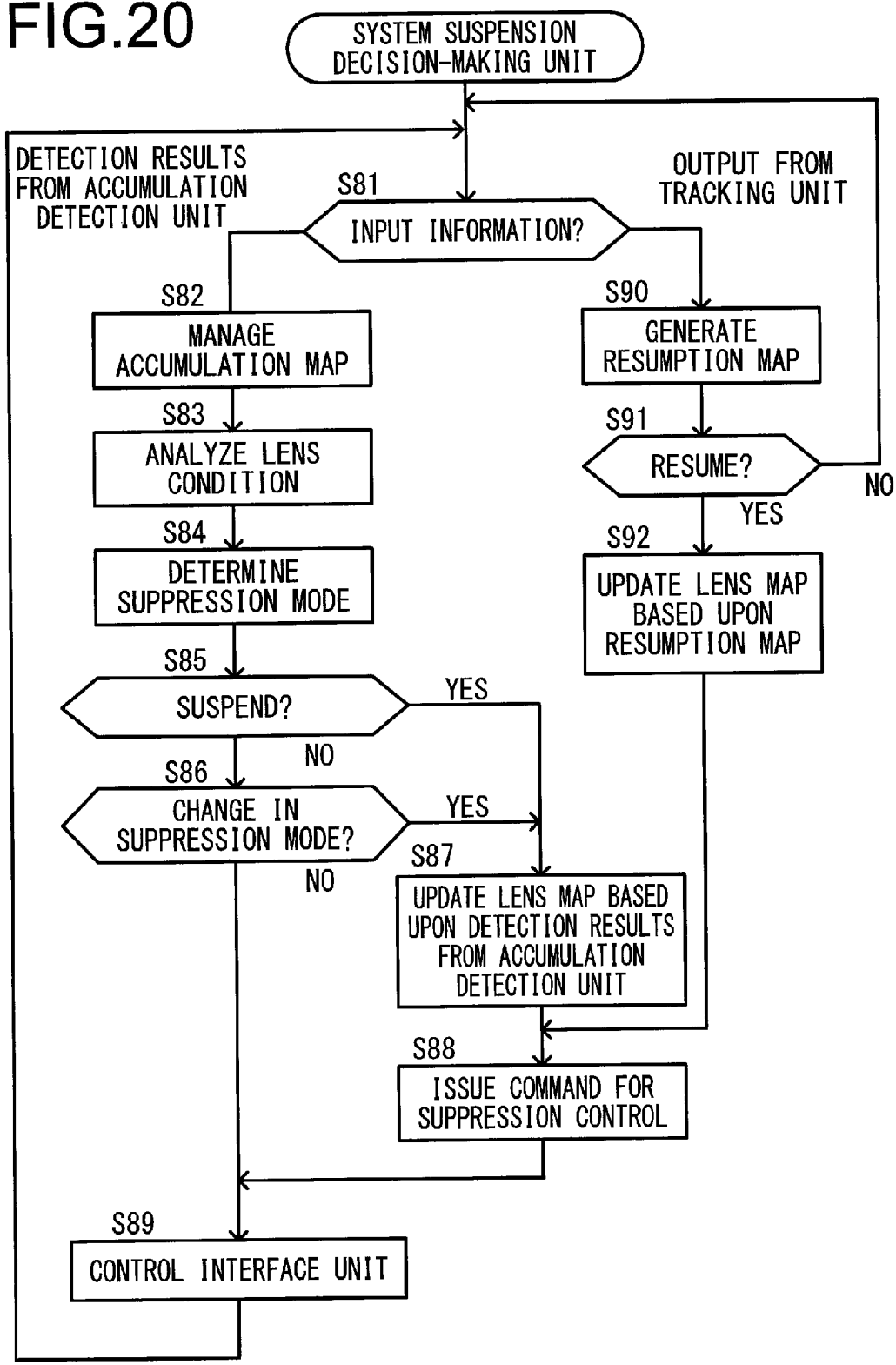

FIG. 20 presents a flowchart of the operation executed by the system suspension decision-making unit 400. Information indicating the detection results, the visibility-assured areas, or the like is input to the system suspension decision-making unit 400 from the various units in the accumulation detection unit 200 or the various units in the tracking unit 300.

In step S81, the system suspension decision-making unit 400 makes a decision as to whether the information input thereto indicates the detection results from the various units in the accumulation detection unit 200 or the visibility-assured areas output from the various units in the tracking unit 300. If the information input thereto indicates the detection results from the various units in the accumulation detection unit 200, the system suspension decision-making unit 400 proceeds to execute the processing in step S82, whereas if the information indicates the visibility-assured areas output from the various units in the tracking unit 300, the system suspension decision-making unit 400 proceeds to execute that processing in step S90.

In step S82, the accumulation map management unit 411 in the suspension unit 410 manages the accumulation map $M_P(x, y)$ based upon the results output from the various units in the accumulation detection unit 200. The accumulation map management unit 411 then outputs the accumulation map $M_P(x, y)$ to the resumption unit 420.

In step S83, the lens condition analysis unit 412 in the suspension decision-making unit 410 calculates coordinates (M(x), M(y)). The lens condition analysis unit 412 then outputs the calculated coordinates (M(x), M(y)) to the suspension decision-making unit 413, the resumption unit 420 and the control unit 450.

In step S84, the suppression control unit 452 selects a suppression mode based upon the coordinates (M(x), M(y)) calculated by the lens condition analysis unit 412 in step S83.

In step S85, the suspension decision-making unit 413 makes a decision as to whether or not to suspend detection of lane marks, other vehicles, pedestrians, road signs, parking frames and the like executed by the application execution unit 500. Namely, the suspension decision-making unit 413 makes a decision as to whether or not the condition (C1) explained earlier exists. If the condition (C1) does not exist, the suspension decision-making unit 413 makes a negative decision in step S85 and the operation proceeds to execute the processing in step S86. If, on the other hand, the condition (C1) exists, the suspension decision-making unit 413 makes an affirmative decision in step S85 and proceeds to execute the processing in step S87.

In step S86, a decision as to whether or not a change has occurred with respect to the suppression mode selected by the suppression control unit 452 in step S85, relative to the immediately preceding suppression mode. A change in the suppression mode in this context may refer to a change in the suppression level, e.g., a shift from the first suppression mode to the second suppression mode, or a switch from an erroneous detection countermeasure suppression mode to a non-detection countermeasure suppression mode and vice versa. If there has been no change in the suppression mode, the suppression control unit 452 makes a negative decision in step S86 and the operation proceeds to step S89. If there has been a change in the suppression mode, the suppression control unit 452 makes an affirmative decision in step S86 and the operation proceeds to step S87.

Figure 21A:
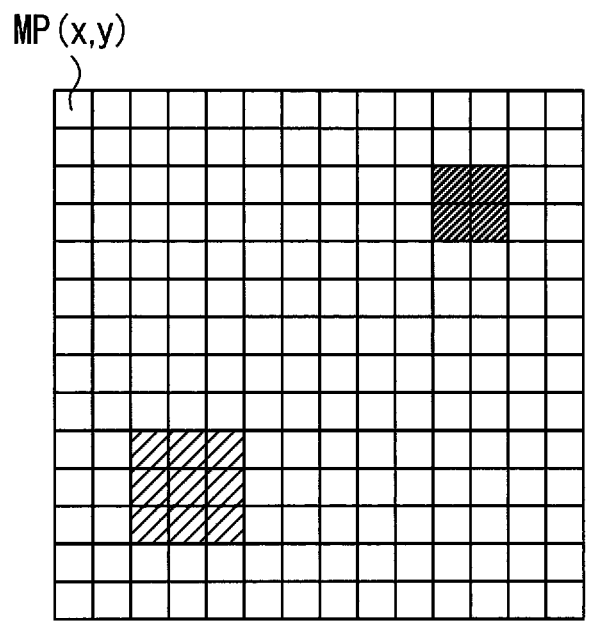
Figure 21B:
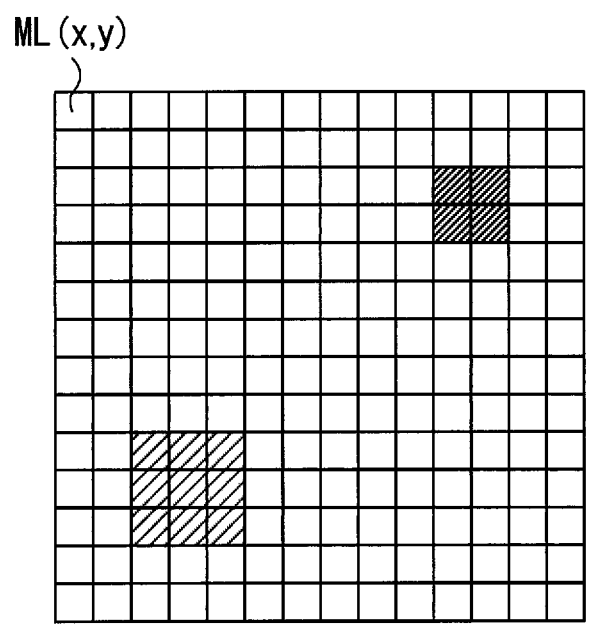

In step S87, the accumulation map $M_P(x, y)$ output from the accumulation map management unit 411 are used for substitution in the lens map $M_L(x, y)$. For instance, the values indicated in the accumulation map $M_P(x, y)$ such as those shown in FIG. 21(a) are substituted for the lens map $M_L(x, y)$ resulting in the lens map $M_L(x, y)$ taking on the values indicated in FIG. 21(b).

In step S88, the suppression control unit 452 determines specific suppression control to be executed for the application execution unit 500, and the integrated decision-making unit 450 transmits a command pertaining to the suppression control to the application execution unit 500.

In step S89, the integrated decision-making unit 453 outputs information pertaining to the suspend/resume states at the various units in the application execution unit 500 to the interface unit 600, before the operation returns to step S81.

In step S90, the resumption map management unit 421 generates a resumption map $M_R(x, y)$ based upon the visibility-assured areas V1(x, y), V2(x, y), V3(x, y), V4(x, y) and V5(x, y) input thereto from the various units in the tracking unit 300.

In step S91, the resumption decision-making unit 425 executes resumption decision-making. The resumption decision-making unit 425 makes a decision as to whether or not the conditions (C3), (C4) and (C5) explained earlier all exist. The resumption decision-making unit 425 makes a negative decision in step S91 if any of the conditions (C3), (C4) and (C5) does not exist and, in this case, the operation proceeds to step S90. The resumption decision-making unit 425 makes an affirmative decision in step S91 if the conditions (C3), (C4) and (C5) all exist, and the operation proceeds to step S92.

Figure 22A:
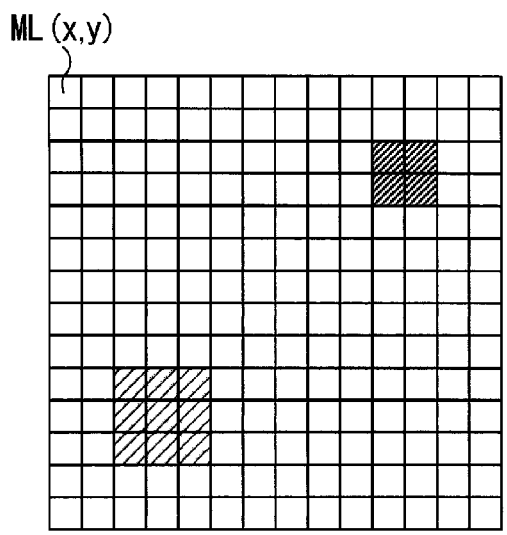
Figure 22B:
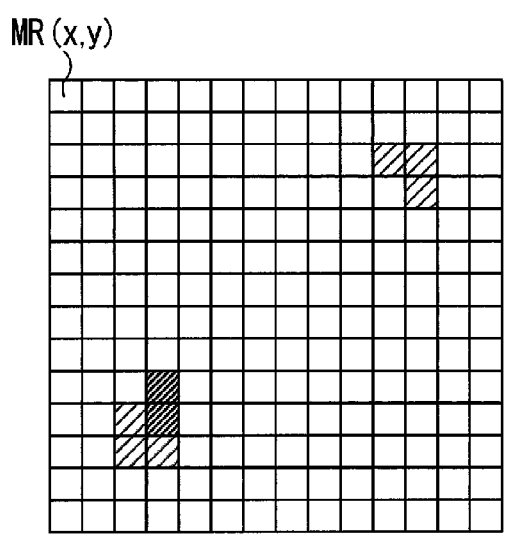
Figure 22C:
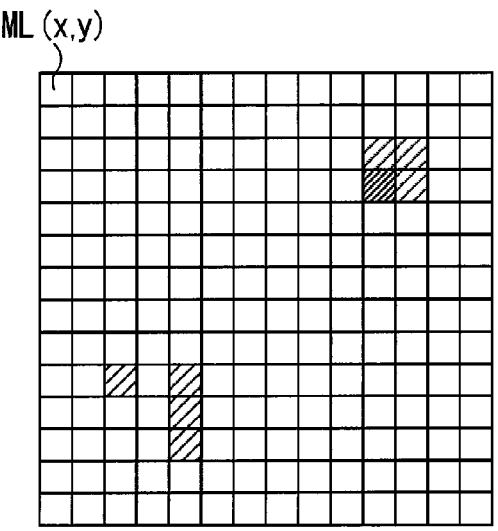

In step S92, the lens map management unit 451 updates the lens map $M_L(x, y)$ based upon the resumption map $M_R(x, y)$ generated in step S90. The lens map management unit 451 may generate an updated lens map $M_L(x, y)$ through a calculation expressed as, for instance, $M_L(x, y)-M_R(x, y)$. By subtracting the values in the resumption map $M_R(x, y)$ indicated in FIG. 22(b) from the values calculated for the lens map $M_L(x, y)$ indicated in FIG. 22(a), the values for the lens map $M_L(x, y)$ are updated to those indicated in FIG. 22(c).

Once the lens map $M_L(x, y)$ is updated in step S92, the system suspension decision-making unit 400 proceeds to execute the processing in step S88.

The following advantages and operations are achieved through the embodiment described above.

(1) The surrounding environment recognition device 1 includes the accumulation detection unit 200 that detects accumulations settled on a camera lens, the tracking unit 300, e.g., the lane tracking unit 310, that detects characteristic quantities related to a given structure in corresponding image areas in a plurality of photographic images obtained in different frames from a camera, i.e., detects a characteristic quantity related to a tracking target image captured in a specific area in an image captured in a reference frame, determines through calculation an estimated area where the characteristic quantity corresponding to the same tracking target image should be detected in an image captured in a later frame relative to the reference frame and makes a decision as to whether or not such a characteristic quantity is detected for the same tracking target image in the estimated area, the application execution unit 500, e.g., the lane recognition unit 510 that recognizes an image of a specific object present in the surrounding environment of the vehicle 9 based upon a photographic image, the suspension decision-making unit 413 that makes a decision, based upon the detection results provided by the accumulation detection unit 200, as to whether or not to suspend the operation of the application execution unit 500 and the resumption decision-making unit 425 that makes a decision based upon whether or not tracking by the tracking unit 300 has been successful, i.e., whether or not a characteristic quantity has been detected in the same tracking target image, as to whether or not to resume the operation of the application execution unit 500, currently in the suspended state. Thus, since the decisions with regard to suspend and resume the operations by the various units in the application execution unit 500 are respectively made by the suspension decision-making unit 413 and the resumption decision-making unit 425 based upon different types of information, the surrounding environment recognition device 1 is able to suspend and resume the object detection processing in a stable manner.

In addition, the tracking unit 300, e.g., the lane tracking unit 310, detects a characteristic quantity pertaining to a tracking target exemplified by characteristic points related to a lane mark 111 in a specific image area such as an image area 113, in the image captured for the frame T. The tracking unit 300, e.g., the lane tracking unit 310, determines through calculation an estimated area such as an image area 115, where the characteristic quantity should be detected in the image captured for the frame T+1. The tracking unit 300, e.g., the lane tracking unit 310, judges that the tracking target such as a lane mark has been tracked successfully if a characteristic quantity equal to the characteristic quantity detected in the frame T is also detected in the estimated area. The surrounding environment recognition device 1 is thus able to make an accurate decision as to whether or not to resume the object detection processing based upon the decision made by the tracking unit 300 indicating whether or not the specific characteristic quantity is detected in the image area where it should be detected.

(2) If the tracking target has been tracked successfully, the tracking unit 300, e.g., the lane tracking unit 310, increases the index, e.g., the values calculated for the visibility-assured area V1(x, y), related to the camera lens visibility over the specific area used for tracking, such as the image area 113, and the estimated area, such as the image area 115, by a predetermined extent, but if the tracking target has not been tracked successfully, it does not increase the visibility factor. If the total sum of index values pertaining to a plurality of types of visibility, calculated for each of a plurality of image areas, e.g., the image blocks B(x, y), in a photographic image is equal to or greater than a predetermined threshold value, e.g., if the condition (C5) exists, the resumption decision-making unit 425 decides that the operation of the application execution unit 500, currently in the suspended state, is to resume. As a result, an accurate decision can be made with regard to resumption of the object detection processing.

(3) The resumption decision-making unit 425 decides that the operation of the application execution unit 500, currently in the suspended state, is to resume if a resumption condition related to whether or not the tracking unit 300 has tracked a tracking target successfully, e.g., the condition (C5), and a resumption condition related to the detection results provided by the accumulation detection unit 200, e.g., the conditions (C3) and (C4), all exist. This means that since further resumption conditions, in addition to the resumption condition related to whether or not the tracking target has been tracked successfully, are imposed when deciding whether or not to resume the object detection processing, the decision-making accuracy is further improved.

(4) Based on the detection results provided by the various units in the accumulation detection unit 200, the lens condition analysis unit 412 calculates an index M(x) pertaining to the lens transmission factor at the camera lens at each of the cameras 2a and 2b and an index M(y) related to the accumulation area where an accumulation is present at the camera lens. The resumption decision-making unit 425 makes a decision as to whether or not an improvement has been achieved with regard to at least either the lens transmission factor at the camera lens or the accumulation area over which the accumulation is present at the camera lens (condition C4)). Thus, an accurate decision can be made with regard to whether or not to resume the operation of the application execution unit 500.

(5) The accumulation detection unit 200 detects a plurality of types of accumulations that may settle on the lens, such as water drops, clouding, water stains and mud. The accumulation map management unit 411 calculates coordinates (M(x), M(y)) by integrating a plurality of sets of detection results based upon the detection results for the plurality of types of accumulations detected by the accumulation detection unit 200. Thus, even though a plurality of sets of detection results are used, the application execution unit 500 does not execute conflicting operations.

The embodiment described above allows for the following variations.

While the cameras 2a and 2b are set up so as to capture images of the road ahead of and behind the vehicle 9 in the embodiment described above, images of road surfaces to the left or to the right relative to the vehicle 9 may also be captured. In addition, as long as images of the road surface around the vehicle 9 can be captured, the cameras may be installed at any positions and their photographic ranges may be set freely.

While the tracking unit 300 in the embodiment described above calculates the distance over which the vehicle 9 travels based upon the traveling speed of the vehicle 9, the traveling distance may be calculated through another method. For instance, the tracking unit 300 may obtain information indicating the distance over which the vehicle 9 has moved from the car navigation system connected to the CAN.

The accumulation detection unit 200 in the embodiment described above includes the water drop detection unit 210, the clouding detection unit 220, the water stain detection unit 230, and the mud detection unit 240. However, the accumulation detection unit 200 does not need to include all these units or it may further include another detection unit. It is to be noted that if any of the water drop detection unit 210, the clouding detection unit 220, the water stain detection unit 230 and the mud detection unit 240 is not included in the accumulation detection unit 200, the normalized score corresponding to the missing detection unit and the coefficient by which the normalized score is multiplied may be removed from expression (1) or the calculation may be executed as expressed in (1) by setting the normalized score for the missing detection unit to 0. In addition, the control map 50 simply represents an example, and if any of the water drop detection unit 210, the clouding detection unit 220, the water stain detection unit 230 and the mud detection unit 240 is not included, the range corresponding to the missing detection unit among the water drop range 51, the mud range 54, the solid-line rectangular clouding range 52 and the solid-line rectangular water stain range 53, will not be set. In addition, the control map 50 may assume coordinate axes other than the coordinate axis pertaining to the lens build-up transmission factor and the coordinate axis pertaining to the accumulation area over which an accumulation is present on the camera lens.

The resumption decision-making unit 425 in the embodiment makes an affirmative decision so as to restore the application execution unit 500 from the suspended state if the conditions (C3), (C4) and (C5) all exist. As an alternative, the resumption decision-making unit 425 may make an affirmative decision so as to restore the application execution unit 500 from the suspended state if at least the condition (C5) exists. For instance, it may make an affirmative decision to restore the application execution unit 500 from the suspended state when the condition (C5) alone exists, when the conditions (C5) and (C3) exist and when the conditions (C5) and (C4) exist. In addition, once the tracking unit 300 correctly recognizes the tracking target, thus satisfying the condition (C5), a decision as to whether or not to restore the application execution unit 500 from the suspended state may be made immediately.

The distance resolution checking unit 350 in the embodiment described above judges the visibility in the blocks B(x, y) over which the image area 151 ranges and the blocks B(x, y) over which the image area 152 ranges by making a decision as to whether or not the average of the edge intensity histograms H4 calculated for the regions in the image area 152 is smaller than the average of the edge intensity histograms H3 calculated for the corresponding regions 151a in the image area 151. However, the present invention is not limited to this example and the distance resolution checking unit 350 may judge the visibility in the blocks B(x, y) over which the image area 151 ranges and the blocks B(x, y) over which the image area 152 ranges through another decision-making method. For instance, the following procedure may be adopted by the distance resolution checking unit 350 when judging the visibility. The distance resolution checking unit 350 calculates the edge intensity differences between the edge intensity levels in the six regions 151a on the upper-side (further-side) in the image area 151 and the edge intensity levels in the six regions on the upper-side (further-side) in the image area 152. In addition, the distance resolution checking unit 350 calculates the edge intensity differences between the edge intensity levels in the six regions 151a on the lower side (closer side) in the image area 151 and the edge intensity levels in the six regions on the lower side (closer-side) in the image area 152. The distance resolution checking unit 350 then makes a decision as to whether the extent to which the edge intensity in the upper-side (further-side) regions becomes lower is smaller than the extent to which the edge intensity in the lower-side (closer-side) regions becomes lower. If the extent to which the edge intensity in the upper-side (further-side) regions becomes lower is smaller than the extent to which the edge intensity in the lower-side (closer-side) regions becomes lower, the distance resolution checking unit 350 judges that good visibility is assured in the blocks B(x, y) over which the image area 151 ranges and the blocks B(x, y) over which the image area 152 ranges.

The suspension decision-making unit 413 in the embodiment described above decides that detection of lane marks, other vehicles, pedestrians, road signs, parking frames and the like by the application execution unit 500 is to be suspended if the condition (C1) exists. As an alternative, the suspension decision-making unit 413 may suspend output provided based on the results of detection executed by the application execution unit 500, instead of suspending the detection by the application execution unit 500. For instance, the output of a warning sound that would normally be provided based upon the results of detection executed by the vehicle detection unit 520 to warn the driver of the risk of a collision with another vehicle, may be suspended. Through these measures, an erroneous output of a warning sound, after recognizing dirt at the camera lens as another vehicle, can be prevented. In addition, instead of prompting the lane recognition unit 510 to suspend the lane mark detection, the suspension decision-making unit 413 may lower the predetermined threshold value $U_{th}$ so as to allow an affirmative decision to be made in step S50 more readily.

While the surrounding environment recognition unit 1 in the embodiment is mounted in the vehicle 9, it may be mounted in another type of mobile object such as a light vehicle without a motor or a train.

It is to be noted that the embodiment and variations thereof described above simply represent examples and that the present invention is in no way limited to these examples. In addition, the embodiment and the variations described above may be adopted in any combination or mode conceivable within the technical scope of the present invention as long as the features characterizing the present invention remain intact.

The disclosure of the following priority application is herein incorporated by reference:

Japanese Patent Application No. 2013-236240 filed Nov. 14, 2013

REFERENCE SIGNS LIST 1 surrounding environment recognition device,
2a, 2b camera
100 photographic image acquisition unit
200 accumulation detection unit
300 tracking unit
400 system suspension decision-making unit
413 suspension decision-making unit
425 resumption decision-making unit

The invention claimed is:

1. A surrounding environment recognition device, comprising:
    an image acquisition unit that obtains a photographic image from a camera for capturing, via a camera lens, an image of a surrounding environment around a mobile object;
    an image recognition unit that recognizes an object image of an object present in the surrounding environment based upon the photographic image obtained by the image acquisition unit;
    an accumulation detection unit that detects accumulation settled on the camera lens based upon the photographic image obtained by the image acquisition unit;
    a suspension decision-making unit that makes a decision, based upon detection results provided by the accumulation detection unit, whether or not to suspend operation of the image recognition unit;
    a tracking unit that detects a characteristic quantity in a tracking target image from a specific area in an image captured by the image acquisition unit for a reference frame, determines through calculation an estimated area where the characteristic quantity should be detected in an image captured by the image acquisition unit for a later frame relative to the reference frame and makes a decision as to whether or not the characteristic quantity for the tracking target image is also present in the estimated area; and
    a resumption decision-making unit that makes a decision, based upon at least decision-making results provided by the tracking unit and indicating whether or not the characteristic quantity for the tracking target image is present, as to whether or not to resume the operation of the image recognition unit currently in a suspended state.

2. The surrounding environment recognition device according to claim 1, wherein:
the resumption decision-making unit allows the operation of the image recognition unit currently in the suspended state to be resumed if the tracking unit judges that the characteristic quantity for the tracking target image is present.

3. The surrounding environment recognition device according to claim 1, wherein:
the suspension decision-making unit decides that the operation of the image recognition unit is to be suspended based upon detection results provided by the accumulation detection unit and indicating that the camera lens is dirty enough to adversely affect image-capturing operation; and
the resumption decision-making unit makes a decision as to whether or not to resume the operation of the image recognition unit, having been suspended based upon the detection results provided by the accumulation detection unit upon deciding that the camera lens is dirty enough to adversely affect the image-capturing operation, if a dirt build-up condition at the camera lens improves to an extent at which the tracking unit is able to judge that the characteristic quantity for the tracking target image is present.

4. The surrounding environment recognition device according to claim 1, wherein:
upon judging that the characteristic quantity for the tracking target image is present, the tracking unit increases an index pertaining to visibility through the camera lens over the specific area and the estimated area by a predetermined extent, whereas upon determining that the characteristic quantity for the tracking target image is not present, the tracking unit does not increase the index pertaining to the visibility; and
the resumption decision-making unit decides that the operation of the image recognition unit currently in the suspended state is to be resumed if a total sum of index values pertaining to a plurality of types of visibility each corresponding to one of a plurality of image areas in the photographic image is equal to or greater than a predetermined threshold value.

5. The surrounding environment recognition device according to claim 4, wherein:
the resumption decision-making unit decides that the operation of the image recognition unit currently in the suspended state is to be resumed if a resumption condition set based upon decision-making results provided by the tracking unit indicating whether or not the characteristic quantity for the tracking target image is present, and a resumption condition set based upon detection results provided by the accumulation detection unit, all exist.

6. The surrounding environment recognition device according to claim 5, wherein:
if an accumulation is detected in the photographic image obtained by the image acquisition unit, the accumulation detection unit increases an index indicating an accumulation condition in an image area where the accumulation is detected by a predetermined value;
the resumption decision-making unit obtains through calculation information related to a lens transmission factor of the camera lens and information related to an accumulation area over which an accumulation is present based upon the index indicating the accumulation condition; and
the resumption decision-making unit makes a decision as to whether or not an improvement is achieved at least either in the lens transmission factor or in the accumulation area at the camera lens as the resumption condition set based upon the detection results provided by the accumulation detection unit.

7. The surrounding environment recognition device according to claim 6, wherein:
the accumulation detection unit individually detects a plurality of types of accumulation;
the surrounding environment recognition device further comprises:
a detection results integrating unit that generates, through calculation, an integrated detection result by integrating a plurality of sets of detection results based upon results obtained by detecting the plurality of types of accumulation; and
the resumption decision-making unit decides that the operation of the image recognition unit currently in the suspended state is to be resumed if the resumption condition set based upon the decision-making results provided by the tracking unit and indicating whether or not the characteristic quantity for the tracking target image is present, a resumption condition set based upon information pertaining to the lens transmission factor and the accumulation area at the camera lens and a resumption condition set based upon a change occurring over time in the integrated detection result, all exist.

8. The surrounding environment recognition device according to claim 7, wherein:
the integrated detection result is indicated as coordinates on a coordinate system assuming a first coordinate axis set in relation to a lens transmission factor by the accumulation and a second coordinate axis set in relation to the accumulation area over which an accumulation is present at the camera lens;
along the first coordinate axis, a higher lens transmission factor is indicated at a point closer to an origin point of the coordinate system;
along the second coordinate axes, a smaller accumulation area is indicated at a point closer to the origin point; and
the resumption decision-making unit makes a decision as to whether or not coordinates indicated by the integrated detection result have moved closer to the origin point continuously over a predetermined length of time as the resumption condition set based upon a change occurring over time in the integrated detection result.

9. The surrounding environment recognition device according to claim 5, wherein:
the accumulation detection unit individually detects a plurality of types of accumulation;
the surrounding environment recognition device further comprises:
a detection results integrating unit that generates, through calculation, an integrated detection result by integrating a plurality of sets of detection results based upon results obtained by detecting the plurality of types of accumulation; and
the resumption decision-making unit decides that the operation of the image recognition unit currently in the suspended state is to be resumed if the resumption condition set based upon the decision-making results provided by the tracking unit and indicating whether or not the characteristic quantity for the tracking target image is present, and a resumption condition set based upon a change occurring over time in the integrated detection result obtained through calculation by the detection results integrating unit based upon the detection results provided by the accumulation detection unit, all exist.

10. The surrounding environment recognition device according to claim 9, wherein:
the integrated detection result is indicated as coordinates on a coordinate system assuming a first coordinate axis set in relation to the lens transmission factor by the accumulation and a second coordinate axis set in relation to the accumulation area over which an accumulation is present at the camera lens;
along the first coordinate axis, a higher lens transmission factor is indicated at a point closer to an origin point of the coordinate system;
along the second coordinate axes, a smaller accumulation area is indicated at a point closer to the origin point; and
the resumption decision-making unit makes a decision as to whether or not coordinates indicated by the integrated detection result have moved closer to the origin point continuously over a predetermined length of time as the resumption condition set based upon a change occurring over time in the integrated detection result.

11. The surrounding environment recognition device according to claim 1, wherein:
the suspension decision-making unit makes a decision as to whether or not to suspend control executed by using input of recognition results from the image recognition unit; and
the resumption decision-making unit makes a decision as to whether or not to resume the control executed by using the input of recognition results from the image recognition unit.

* * * * *